(12) United States Patent  (10) Patent No.: US 12,440,294 B2
Kottenstette et al.  (45) Date of Patent: Oct. 14, 2025

(54) MEDICAL DEVICE SYSTEMS, METHODS AND COMPUTER-READABLE MEDIUMS FOR OPERATING THE SAME

(71) Applicant: Corindus, Inc., Waltham, MA (US)

(72) Inventors: Nicholas Kottenstette, Sterling, MA (US); Per Bergman, West Roxbury, MA (US); Yao Li, Belmont, MA (US)

(73) Assignee: Siemens Healthineers Endovascular Robotics, Inc., Newton, MA (US)

( * ) Notice: Subject to any disclaimer, the term of this patent is extended or adjusted under 35 U.S.C. 154(b) by 383 days.

(21) Appl. No.: 17/452,138

(22) Filed: Oct. 25, 2021

(65) Prior Publication Data

US 2023/0128665 A1  Apr. 27, 2023

(51) Int. Cl.
*A61B 34/37* (2016.01)
*A61B 34/30* (2016.01)
*G16H 40/67* (2018.01)

(52) U.S. Cl.
CPC ............. *A61B 34/37* (2016.02); *G16H 40/67* (2018.01); *A61B 2034/301* (2016.02)

(58) Field of Classification Search
CPC ... A61B 34/37; A61B 2034/301; G16H 40/67
See application file for complete search history.

(56) References Cited

U.S. PATENT DOCUMENTS

| | | | |
|---|---|---|---|
| 5,515,478 A | 5/1996 | Wang | |
| 5,524,180 A | 6/1996 | Wang et al. | |
| 5,553,198 A | 9/1996 | Wang et al. | |
| 5,657,429 A | 8/1997 | Wang et al. | |
| 5,740,802 A | 4/1998 | Nafis et al. | |
| 5,754,741 A | 5/1998 | Wang et al. | |
| 5,762,458 A | 6/1998 | Wang et al. | |
| 5,815,640 A | 9/1998 | Wang et al. | |
| 5,855,583 A | 1/1999 | Wang et al. | |
| 5,911,036 A | 6/1999 | Wright et al. | |
| 5,921,938 A | 7/1999 | Aoyama et al. | |
| 6,102,850 A | 8/2000 | Wang et al. | |
| 6,436,107 B1 | 8/2002 | Wang et al. | |
| 6,490,490 B1 | 12/2002 | Uchikubo et al. | |
| 6,496,099 B2 | 12/2002 | Wang et al. | |
| 6,574,355 B2 | 6/2003 | Green | |

(Continued)

FOREIGN PATENT DOCUMENTS

CA 2395516 A1 5/2001
CN 111856942 5/2022

(Continued)

OTHER PUBLICATIONS

European Search Report for Corresponding EP Application No. 22203299.7, received Mar. 20, 2023.

(Continued)

*Primary Examiner* — Mohamad O El Sayah

(57) ABSTRACT

A robotic medical device system includes a robotic medical device and a controller. The controller is configured to control, in response to one or more control signals, movement of the robotic medical device to maintain a substantially constant overshoot for different step responses of the robotic medical device system independent of variations in a delay associated with control of the robotic medical device, the one or more control signals received via a network.

20 Claims, 25 Drawing Sheets

(56) References Cited

U.S. PATENT DOCUMENTS

| | | |
|---|---|---|
| 6,642,836 B1 | 11/2003 | Wang et al. |
| 6,646,541 B1 | 11/2003 | Wang et al. |
| 6,726,675 B1 | 4/2004 | Beyar |
| 6,728,599 B2 | 4/2004 | Wang et al. |
| 6,768,425 B2 | 7/2004 | Flaherty et al. |
| 6,785,593 B2 | 8/2004 | Wang et al. |
| 6,799,088 B2 | 9/2004 | Wang et al. |
| 6,836,703 B2 | 12/2004 | Wang et al. |
| 6,852,107 B2 | 2/2005 | Wang et al. |
| 6,871,117 B2 | 3/2005 | Wang et al. |
| 6,892,112 B2 | 5/2005 | Wang et al. |
| 6,925,357 B2 | 8/2005 | Wang et al. |
| 6,950,691 B2 | 9/2005 | Uchikubo |
| 6,955,671 B2 | 10/2005 | Uchikubo |
| 7,239,940 B2 | 7/2007 | Wang et al. |
| 7,257,158 B1 | 8/2007 | Figueredo et al. |
| 7,272,430 B2 | 9/2007 | Uchikubo |
| 7,386,730 B2 | 6/2008 | Uchikubo |
| 7,485,115 B2 | 2/2009 | Nakamura |
| 8,185,623 B2 | 5/2012 | Lewis et al. |
| 8,321,284 B2 | 11/2012 | Clements et al. |
| 8,340,819 B2 | 12/2012 | Mangaser et al. |
| 8,396,598 B2 | 3/2013 | Sutherland et al. |
| 8,401,869 B2 | 3/2013 | Renzi et al. |
| 8,621,445 B2 | 12/2013 | Bangfei et al. |
| 8,631,506 B2 | 1/2014 | Wise et al. |
| 8,661,487 B2 | 2/2014 | Pham et al. |
| 8,670,017 B2 | 3/2014 | Stuart et al. |
| 8,671,950 B2 | 3/2014 | Weitzner et al. |
| 8,806,051 B2 | 8/2014 | Wang et al. |
| 8,924,234 B2 | 12/2014 | Renzi et al. |
| 9,001,216 B2 | 4/2015 | Sampathkumaran et al. |
| 9,105,200 B2 | 8/2015 | Chen et al. |
| 9,131,259 B2 | 9/2015 | Pham et al. |
| 9,191,425 B2 | 11/2015 | Momchilov et al. |
| 9,203,883 B2 | 12/2015 | Momchilov et al. |
| 9,436,522 B2 | 9/2016 | Choi et al. |
| 9,820,658 B2 | 11/2017 | Tran |
| 9,876,840 B2 | 1/2018 | Nandakumar et al. |
| 9,973,638 B2 | 5/2018 | Pring |
| 10,069,887 B2 | 9/2018 | Hodapp |
| 10,320,875 B2 | 6/2019 | Bradbury et al. |
| 10,449,007 B2 | 10/2019 | Deboeuf et al. |
| 10,594,483 B2 | 3/2020 | Smart |
| 10,672,098 B1 | 6/2020 | Chemparathy et al. |
| 2005/0038416 A1 | 2/2005 | Wang et al. |
| 2005/0154288 A1 | 7/2005 | Wang et al. |
| 2007/0239186 A1 | 10/2007 | Weitzner et al. |
| 2008/0015415 A1 | 1/2008 | Obata et al. |
| 2008/0161784 A1 | 7/2008 | Hogan et al. |
| 2009/0132281 A1 | 5/2009 | Lyshkow |
| 2011/0306986 A1 | 12/2011 | Lee et al. |
| 2012/0191464 A1 | 7/2012 | Stuart et al. |
| 2012/0227113 A1 | 9/2012 | Wise et al. |
| 2012/0317278 A1 | 12/2012 | Tamaki et al. |
| 2013/0066469 A1 | 3/2013 | Mangaser et al. |
| 2013/0290015 A1 | 10/2013 | Johnson |
| 2014/0039277 A1 | 2/2014 | Abraham |
| 2015/0347682 A1 | 12/2015 | Chen et al. |
| 2016/0256185 A1* | 9/2016 | Shelton, IV ......... A61B 17/068 |
| 2016/0368146 A1* | 12/2016 | Mangaser ............ G05D 1/0022 |
| 2017/0293295 A1* | 10/2017 | Tani ....................... A01B 69/00 |
| 2019/0295756 A1 | 9/2019 | Zhang et al. |
| 2020/0405375 A1* | 12/2020 | Shelton, IV ....... A61B 18/1815 |
| 2021/0086374 A1* | 3/2021 | Brandt .................... B25J 9/1674 |
| 2021/0220064 A1 | 7/2021 | Kottenstette et al. |
| 2021/0258903 A1* | 8/2021 | Suzuki ............... H04W 56/0055 |
| 2022/0275604 A1* | 9/2022 | Igarashi ................ G05D 1/0022 |
| 2023/0054209 A1* | 2/2023 | Roh ........................ A61B 34/76 |

FOREIGN PATENT DOCUMENTS

| | | | |
|---|---|---|---|
| JP | 2005261956 A | 9/2005 | |
| JP | 2007325960 A | 12/2007 | |
| JP | 2011028495 A | 2/2011 | |
| JP | 2018107568 | 7/2018 | |
| JP | 2021524298 | 9/2021 | |
| KR | 1020100078034 A | 7/2010 | |
| WO | 2004012018 A2 | 2/2004 | |
| WO | 2011109336 A2 | 9/2011 | |
| WO | 2012140294 A1 | 10/2012 | |
| WO | 2013008252 A2 | 1/2013 | |
| WO | 2019222641 | 11/2019 | |
| WO | 2019225118 | 11/2019 | |
| WO | WO-2019222641 A1 * | 11/2019 | ............. A61B 34/25 |
| WO | 2019239697 | 12/2019 | |
| WO | 2023061892 | 4/2021 | |

OTHER PUBLICATIONS

Al-Ahmadi, Saleh O: "Design of a self-turning fuzzy logic controller for system with variable time delay"; Jul. 3, 2002 (Jul. 3, 2002), XP093030826; ISBN: 978-0-493-62023-7; Retrieved from the Internet: URL:https://www.proquest.com/docview/276517581/fulltextPDF/B40AA3CBCBE1453PQ/1?acco untid=29404 [retrieved on 2023-03-10] *the whole document*.

Anonymous: "PID controller—Wikipedia", Aug. 10, 2021 (Aug. 10, 2021); pp. 1-27; XP093021062; Retrieved from the Internet: URL:https://web.archive.org/web/20210810205633/https://en.wikipedia.org/wiki/PID_controller [retrieved on Feb. 6, 2023] * the wohle document*.

Anvari et al.; Establishment of the World's First Telerobotic Remote Surgical Service; Annals of Surgery; Mar. 2005; pp. 460-464; vol. 241, No. 3; Lippincott Williams & Wilkins.

Avgousti et al.; Medical telerobotic systems: current status and future trends; BioMedical Engineering OnLine (2016) 15:96; Published online Aug. 12, 2016; 40 pages.

International Search Report and Written Opinion for PCT/US2019/032888; mail date Aug. 29, 2019; 12 pages.

MaCrae; The Robo-Doctor Will See You Now, May 2012; https://www.asme.org/engineering-topics/articles/robotics/robo-doctor-will see-you-now; retrieved on Jan. 19, 2014; 5 pages.

Parsell; Surgeons in U.S. Perform Operation in France Via Robot; nationalgeographic.com/news; Sep. 19, 2001; http://news.nationalgeographic.com/news/pf/15081787.html; retrieved on Jan. 19, 2014; 3 pages.

Saenz; Remote Controlled Robot Performs Heart Surgery on British Man; http://singularityhub.com/2010/0505/remote-controlled-robot-performs-heart-surgery-on - . . . ; posted May 5, 2010; retrieved Jan. 19, 2014; 5 pages.

SRI International; AM7 Surgical Robot; http://www.sri.com/engage/products-solutions/m7-surgical-robot; retrieved on Jan. 20, 2014; 1 page.

Garcia, Pablo, et al. "Trauma Pod: a semi-automated telerobotic surgical system." The International Journal of Medical Robotics and Computer Assisted Surgery 5.2 (2009): 136-146.

N. Kottenstette, et al., "Design of Networked Control Systems Using Passivity," IEEE Transactions on Control Systems Technology, vol. 21, No. 3, pp. 649-665, May 2013.

* cited by examiner

MEDICAL DEVICE SYSTEMS, METHODS AND COMPUTER-READABLE MEDIUMS FOR OPERATING THE SAME

BACKGROUND

Field

One or more example embodiments relate to robotic medical device systems, remote communications and control systems for devices used in robotic interventional procedures, methods and/or non-transitory computer-readable mediums for operating the same.

Related Art

Catheters (and other elongated medical devices) may be used for minimally-invasive medical procedures for the diagnosis and treatment of diseases of various vascular systems, including neurovascular intervention (NVI) (also known as neurointerventional surgery), percutaneous coronary intervention (PCI) and peripheral vascular intervention (PVI). Robotic catheter procedure systems may be used to aid a physician in performing catheterization procedures such as those noted above.

SUMMARY

At least one example embodiment provides a robotic medical device system comprising a robotic medical device and a controller. The controller is configured to control, in response to one or more control signals, movement of the robotic medical device to maintain a substantially constant overshoot for different step responses of the robotic medical device system independent of variations in a delay associated with control of the robotic medical device, the one or more control signals received via a network.

At least one example embodiment provides a robotic medical device system comprising: a robotic medical device; and a means for controlling, in response to one or more control signals, movement of the robotic medical device to maintain a substantially constant overshoot for different step responses of the robotic medical device system independent of variations in a delay associated with control of the robotic medical device, the one or more control signals received via a network.

According to one or more example embodiments, the delay may include at least one of a command delay or an image feedback delay.

The controller may be configured to control the movement of the robotic medical device to maintain a substantially constant maximum overtravel distance of the robotic medical device.

The delay may be at least partially based on a transmission delay for the network.

The movement of the robotic medical device may include at least one of linear or rotational movement.

The controller may be configured to control a velocity of the robotic medical device to maintain the substantially constant overshoot.

The controller may be configured to control the velocity of the robotic medical device to limit a maximum overtravel distance of the robotic medical device.

The velocity may be a linear or rotational velocity.

The means for controlling may include a means for controlling the movement of the robotic medical device to maintain a substantially constant maximum overtravel distance of the robotic medical device.

The means for controlling may include a means for controlling a velocity of the robotic medical device to maintain the substantially constant overshoot.

The means for controlling may include a means for controlling a velocity of the robotic medical device to limit a maximum overtravel distance of the robotic medical device.

At least one example embodiment provides a method of operating a robotic medical device system including a robotic medical device and a controller, the method comprising: controlling, in response to one or more control signals, movement of the robotic medical device to maintain a substantially constant overshoot for different step responses of the robotic medical device system independent of variations in a delay associated with control of the robotic medical device, the one or more control signals received via a network.

At least one example embodiment provides a non-transitory computer readable storage medium storing computer readable instructions that, when executed by a controller and/or one or more processors at a robotic medical device system, causes the robotic medical device system to perform a method comprising: controlling, in response to one or more control signals, movement of a robotic medical device to maintain a substantially constant overshoot for different step responses of the robotic medical device system independent of variations in a delay associated with control of the robotic medical device, the one or more control signals received via a network.

According to one or more example embodiments, the delay may include at least one of a command delay or an image feedback delay.

The controlling may control the movement of the robotic medical device to maintain a substantially constant maximum overtravel distance of the robotic medical device.

The delay may be at least partially based on a transmission delay for the network.

The movement of the robotic medical device may include at least one of linear or rotational movement.

The controlling may include controlling a velocity of the robotic medical device to maintain the substantially constant overshoot.

The controlling a velocity may include controlling the velocity of the robotic medical device to limit a maximum overtravel distance of the robotic medical device.

The velocity may be a linear or rotational velocity

At least one other example embodiment provides a robotic medical device system comprising a robotic medical device and a controller. The controller is configured to control, in response to one or more control signals, movement of the robotic medical device to maintain a substantially constant maximum overtravel distance of the robotic medical device independent of variations in a delay associated with control of the robotic medical device, the delay being between a maximum acceptable delay threshold and a disable threshold, and the one or more control signals being received via a network.

At least one other example embodiment provides a robotic medical device system comprising: a robotic medical device; and a means for controlling, in response to one or more control signals, movement of the robotic medical device to maintain a substantially constant maximum overtravel distance of the robotic medical device independent of variations in a delay associated with control of the robotic medical device, the delay being between a maximum acceptable delay threshold and a disable threshold, and the one or more control signals being received via a network.

According to one or more example embodiments, the controller may be configured to disable operation of the robotic medical device in response to the delay being greater than the disable threshold.

The means for controlling may include a means for disabling operation of the robotic medical device in response to the delay being greater than the disable threshold.

The controller may be configured to constrain a velocity of the robotic medical device to maintain the substantially constant maximum overtravel distance in response to the delay being between the maximum acceptable delay threshold and the disable threshold.

The means for controlling may include a means for constraining a velocity of the robotic medical device to maintain the substantially constant maximum overtravel distance in response to the delay being between the maximum acceptable delay threshold and the disable threshold.

The velocity of the robotic medical device may be unconstrained in response to the delay being less than the maximum acceptable delay threshold.

At least one other example embodiment provides method of operating a robotic medical device system including a robotic medical device and a controller, the method comprising: controlling, in response to one or more control signals, movement of the robotic medical device to maintain a substantially constant maximum overtravel distance of the robotic medical device independent of variations in a delay associated with control of the robotic medical device, the delay being between a maximum acceptable delay threshold and a disable threshold, and the one or more control signals being received via a network.

At least one example embodiment provides a non-transitory computer readable storage medium storing computer readable instructions that, when executed by a controller and/or one or more processors at a robotic medical device system, causes the robotic medical device system to perform a method comprising: controlling, in response to one or more control signals, movement of a robotic medical device to maintain a substantially constant maximum overtravel distance of the robotic medical device independent of variations in a delay associated with control of the robotic medical device, the delay being between a maximum acceptable delay threshold and a disable threshold, and the one or more control signals being received via a network.

According to one or more example embodiments, the method may further include disabling operation of the robotic medical device in response to the delay being greater than the disable threshold.

The method may further include constraining a velocity of the robotic medical device to maintain the substantially constant maximum overtravel distance in response to the delay being between the maximum acceptable delay threshold and the disable threshold.

The velocity of the robotic medical device may be unconstrained in response to the delay being less than the maximum acceptable delay threshold.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
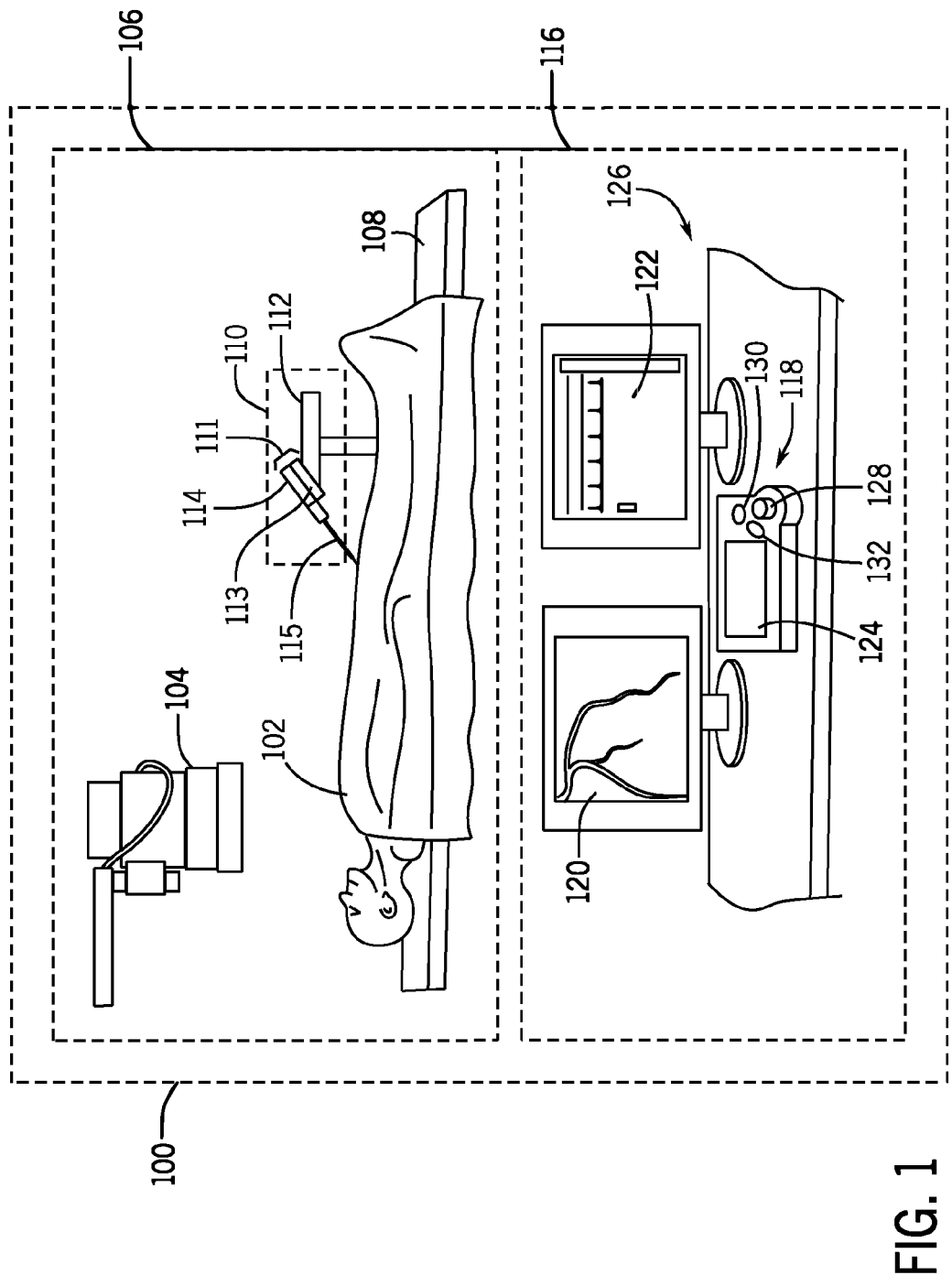
FIG. 1 is a perspective view of a catheter procedure system in accordance with example embodiments.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Catheters (and other elongated medical devices) may be used for minimally-invasive medical procedures for the diagnosis and treatment of diseases of various vascular systems, including neurovascular intervention (NVI) (also known as neurointerventional surgery), percutaneous coronary intervention (PCI) and/or peripheral vascular intervention (PVI). These procedures typically involve navigating a guidewire through the vasculature, and advancing a working catheter via the guidewire to deliver therapy. The catheterization procedure starts by gaining access into the appropriate vessel, such as an artery or vein, with a sheath or guide catheter using standard percutaneous techniques. The sheath or guide catheter is then advanced over a diagnostic guidewire to the primary location such as an internal carotid artery for NVI, a coronary ostium for PCI or a superficial femoral artery for PVI. A guidewire suitable for the vasculature is then navigated through the sheath or guide catheter to a target location in the vasculature. In certain situations, such as in tortuous anatomy, a support catheter or microcatheter is inserted over the guidewire to assist in navigating the guidewire. The physician or operator may use an imaging system (e.g., fluoroscope) to obtain a cine with a contrast injection and select a fixed frame for use as a roadmap to navigate the guidewire or catheter to the target location, for example a lesion.

Contrast-enhanced images may also be obtained while the physician delivers the guidewire or catheter device so that the physician can verify that the device is moving along the correct path to the target location. While observing the anatomy using fluoroscopy, the physician manipulates the proximal end of the guidewire or catheter to direct the distal tip into the appropriate vessels toward the lesion and avoid advancing into side branches.

Robotic catheter procedure systems may be used to aid a physician in performing catheterization procedures such as, for example, NVI, PCI and PVI. Examples of NVI catheter procedures include coil embolization of aneurysms, liquid embolization of arteriovenous malformations and mechanical thrombectomy of large vessel occlusions in the setting of acute ischemic stroke.

In NVI, the physician uses a robotic system to gain lesion access by manipulating a neurovascular guidewire and microcatheter to deliver the therapy to restore normal blood flow. The access is enabled by the sheath or guide catheter, but may also require an intermediate catheter for more distal territory or to provide adequate support for the microcatheter and guidewire. The distal tip of a guidewire is navigated into, or past, the lesion depending on the type of lesion and treatment.

For treating aneurysms, the microcatheter is advanced into the lesion and the guidewire is removed and several coils are deployed into the aneurysm through the microcatheter and used to embolize the aneurysm.

For treating arteriovenous malformations, a liquid embolic is injected into the malformation via a microcatheter.

Mechanical thrombectomy to treat vessel occlusions can be achieved either through aspiration or use of a stent retriever. Aspiration is either done directly through the microcatheter, or with a larger bore aspiration catheter. Once the aspiration catheter is at the lesion, negative pressure is applied to remove the clot through the catheter. Alternatively, the clot can be removed by deploying a stent retriever through the microcatheter. Once the clot has integrated into the stent retriever, the clot is retrieved by retracting the stent retriever and microcatheter into the guide catheter.

In PCI, the physician uses a robotic system to gain lesion access by manipulating a coronary guidewire to deliver the therapy and restore normal blood flow. The access is enabled by seating a guide catheter in a coronary ostium. The distal tip of the guidewire is navigated past the lesion and, for complex anatomies, a microcatheter may be used to provide adequate support for the guidewire. The blood flow is restored by delivering and deploying a stent or balloon at the lesion. The lesion may need preparation prior to stenting, by either delivering a balloon for pre-dilation of the lesion, or by performing atherectomy using, for example, a laser or rotational atherectomy catheter and a balloon over the guidewire. Diagnostic imaging and physiological measurements may be performed to determine appropriate therapy by using imaging catheters or FFR measurements.

In PVI, the physician uses a robotic system to deliver the therapy and restore blood flow with techniques similar to NVI. The distal tip of the guidewire is navigated past the lesion and a microcatheter may be used to provide adequate support for the guidewire for complex anatomies. The blood flow is restored by delivering and deploying a stent or balloon to the lesion. As with PCI, lesion preparation and diagnostic imaging may be used as well.

In one example, an operator of the robotic system used for the medical procedure is located in the same room or an adjacent room to the patient and robotic system. In another example, an operator may be located at a remote location (e.g., a different building, a different city, etc.) to operate the robotic system to perform the medical procedure. A system that allows an operator at a remote location to control and operate a robotic medical procedure system provides patients in, for example, smaller communities access to medical specialists that may not be available locally. In addition, patients requiring emergency medical procedures may be treated at a local hospital by a specialist located remotely which can decrease the time before an interventional procedure is performed. For example, an interventional procedure to treat a patient with an acute ischemic stroke due to large vessel occlusion (LVO), or to treat a patient with ST-segment-elevation myocardial infarction (STEMI) may be performed more quickly.

FIG. 1 is a perspective view of a catheter procedure system in accordance with example embodiments.

Referring to FIG. 1, a catheter procedure system 100 may be used to perform catheter based medical procedures including, for example, a percutaneous intervention procedure such as, a percutaneous coronary intervention (PCI), a neurovascular interventional procedure (e.g., to treat large vessel occlusion (LVO)), PCI for ST-segment elevation myocardial infarction, peripheral vascular intervention procedures, etc.

Catheter based medical procedures may also include diagnostic catheterization procedures during which one or more catheters (or other elongated medical devices) are used to aid in the diagnosis of a patient's disease. For example, in at least one example embodiment of a catheter based diagnostic procedure, a contrast media is injected into one or more coronary arteries through a catheter, and an image of the patient's heart is taken.

Catheter based medical procedures may also include catheter based therapeutic procedures (e.g., angioplasty, stent placement, treatment of peripheral vascular disease, etc.) during which a catheter (or other elongated medical device) is used to treat a disease.

It should be noted that one skilled in the art would recognize that certain specific percutaneous intervention devices or components (e.g., type of guide wire, type of catheter, etc.) may be selected based on the type of procedure that is to be performed. Catheter procedure system 100 is capable of performing any number of catheter based medical procedures with minor adjustments to accommodate the specific percutaneous intervention devices to be used in the procedure. In particular, while example embodiments of catheter procedure system 100 described herein are explained primarily with regard to the diagnosis and/or treatment of coronary disease, catheter procedure system 100 may be used to diagnose and/or treat any type of disease or condition amenable to diagnosis and/or treatment via a catheter-based procedure.

Catheter procedure system 100 includes lab unit 106 and workstation 116. A robotic catheter system, shown as bedside system 110, is located within lab unit 106 adjacent to patient 102. Patient 102 is supported on a table 108. Generally, bedside system 110 may be equipped with the appropriate percutaneous intervention devices or other components (e.g., guide wires, guide catheters, working catheters such as balloon catheters and stent delivery system, contrast media, medicine, diagnostic catheters, etc.) to allow the user to perform a catheter based medical procedure via a robotic system by operating various controls such as the controls located at workstation 116. Bedside system 110 may include any number and/or combination of components to provide bedside system 110 with the functionality described herein.

Bedside system 110 includes, among other elements, a drive assembly 111 supported by a robotic arm 112. The drive assembly 111 includes a cassette 114 mounted on a robotic drive 113, which may be used to drive an elongated medical device 115 such as a catheter or guide wire. For example, the drive assembly 111 may be used to automatically feed a guide wire into a guide catheter seated in an artery of the patient 102.

Bedside system 110 is in communication with workstation 116, allowing signals generated by the user input of workstation 116 to be transmitted to bedside system 110 to control the various functions of bedside system 110. Bedside system 110 may also provide feedback signals (e.g., operating conditions, warning signals, error codes, etc.) to workstation 116. Bedside system 110 may be connected to workstation 116 via a communication link 140 (shown in FIG. 2). The communication link 140 may be a wireless connection, cable connections, or any other means capable of allowing communication to occur between workstation 116 and bedside system 110.

Workstation 116 includes a user interface 126 configured to receive user input to operate various components or systems of catheter procedure system 100. User interface 126 includes controls 118 that allow the user to control bedside system 110 to perform a catheter based medical procedure. For example, controls 118 may be configured to cause bedside system 110 to perform various tasks using the various percutaneous intervention devices (e.g., elongated medical devices) with which bedside system 110 may be equipped (e.g., to advance, retract, or rotate a guide wire, advance, retract or rotate a working catheter, advance, retract, or rotate a guide catheter, inflate or deflate a balloon located on a catheter, position and/or deploy a stent, inject contrast media into a catheter, inject medicine into a catheter, or to perform any other function that may be performed as part of a catheter based medical procedure). Drive assembly 111 includes various drive mechanisms to cause movement (e.g., axial and rotational movement) of the components of the bedside system 110 including the percutaneous intervention devices.

In at least one example embodiment, controls 118 include a touch screen 124, one or more joysticks 128 and buttons 130, 132. The joystick 128 may be configured to advance, retract, or rotate various components and percutaneous intervention devices such as, for example, a guide wire, a guide catheter or a working catheter. Buttons 130, 132 may include, for example, an emergency stop button and a multiplier button. When an emergency stop button is pushed a relay is triggered to cut the power supply to bedside system 110.

Multiplier button acts to increase or decrease the speed at which the associated component is moved in response to a manipulation of controls 118. In an example embodiment, controls 118 may include one or more controls or icons (not shown) displayed on touch screen 124, that, when activated, causes operation of a component of the catheter procedure system 100.

Controls 118 may also include a balloon or stent control that is configured to inflate or deflate a balloon and/or a stent. Each of the controls may include one or more buttons, joysticks, touch screen, etc. that may be desirable to control the particular component to which the control is dedicated. In addition, touch screen 124 may display one or more icons (not shown) related to various portions of controls 118 or to various components of catheter procedure system 100.

User interface 126 may include a first monitor or display 120 and a second monitor or display 122. In other embodiments, the user interface 126 may include one display or more than two displays. First monitor 120 and second monitor 122 may be configured to display information or patient specific data to the user located at workstation 116. For example, first monitor 120 and second monitor 122 may be configured to display image data (e.g., x-ray images, MRI images, CT images, ultrasound images, etc.), hemodynamic data (e.g., blood pressure, heart rate, etc.), patient record information (e.g., medical history, age, weight, etc.). In addition, first monitor 120 and second monitor 122 may be configured to display procedure specific information (e.g., duration of procedure, catheter or guide wire position, volume of medicine or contrast agent delivered, etc.). Monitor 120 and monitor 122 may be configured to display information regarding the position the guide catheter. Further, monitor 120 and monitor 122 may be configured to display information to provide the functionalities associated with controller 134 (shown in FIG. 3). In another example embodiment, user interface 126 includes a single screen of sufficient size to display one or more of the display components and/or touch screen components discussed herein.

Catheter procedure system 100 also includes an imaging system 104 located within lab unit 106. Imaging system 104 may be any medical imaging system that may be used in conjunction with a catheter based medical procedure (e.g., non-digital x-ray, digital x-ray, CT, MRI, ultrasound, etc.). In an example embodiment, imaging system 104 is a digital x-ray imaging device that is in communication with workstation 116. In an example embodiment, imaging system 104 may include a C-arm (not shown) that allows imaging system 104 to partially or completely rotate around patient 102 in order to obtain images at different angular positions relative to patient 102 (e.g., sagittal views, caudal views, anterior-posterior views, etc.).

Imaging system 104 may be configured to take x-ray images of the appropriate area of patient 102 during a particular procedure. For example, imaging system 104 may be configured to take one or more x-ray images of the heart to diagnose a heart condition.

Imaging system 104 may also be configured to take one or more x-ray images during a catheter based medical procedure (e.g., real time images) to assist the user of workstation 116 to properly position a guide wire, guide catheter, stent, etc. during the procedure. The image or images may be displayed on first monitor 120 and/or second monitor 122. In particular, images may be displayed on first monitor 120 and/or second monitor 122 to allow the user to, for example, accurately move a guide catheter into the proper position.

Figure 2:
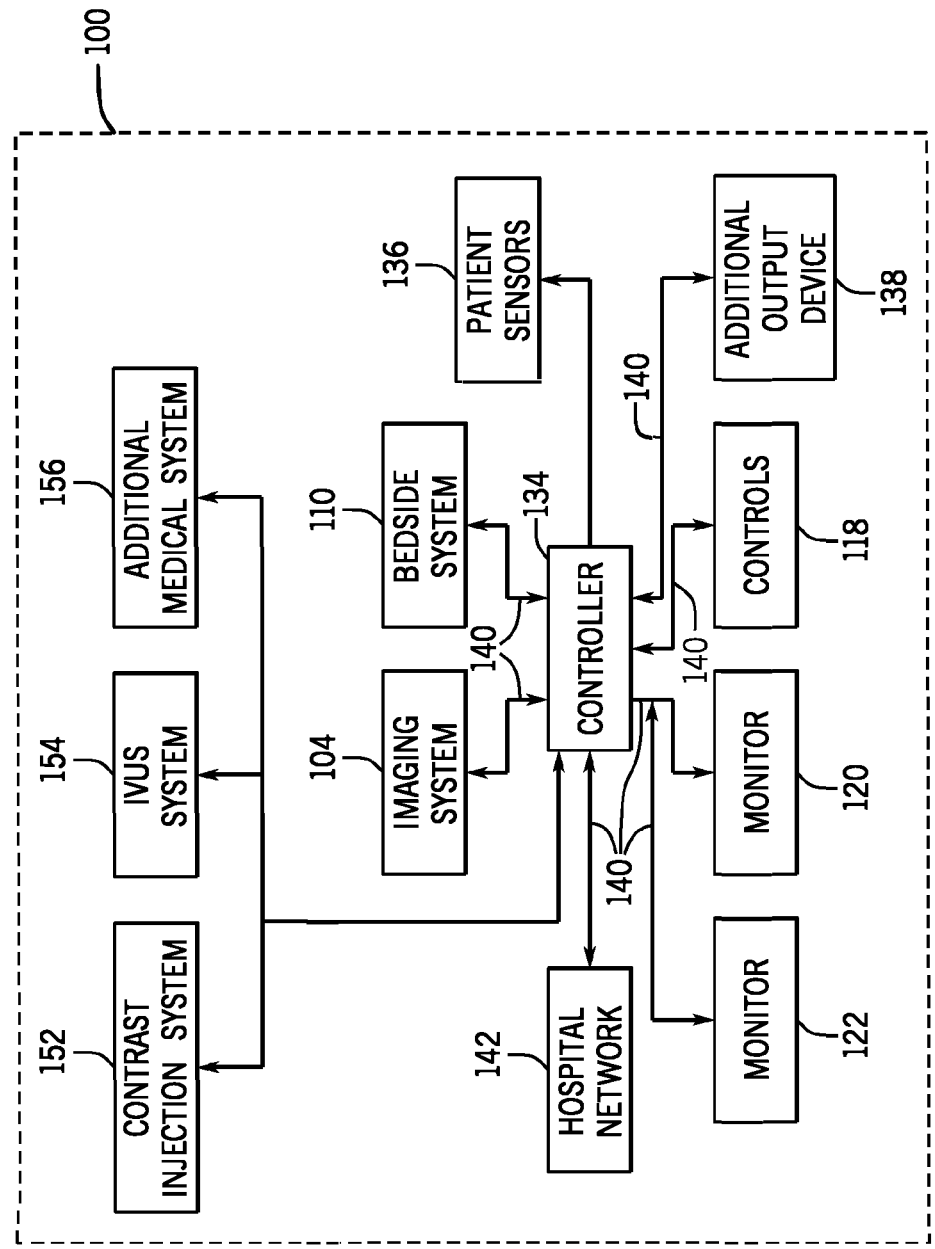
FIG. 2 is a schematic block diagram of a catheter procedure system in accordance with example embodiments

Referring to FIG. 2, a block diagram of catheter procedure system 100 is shown according to an example embodiment. Catheter procedure system 100 may include a controller 134. Controller 134 may be part of workstation 116 (shown in FIG. 1). Controller 134 may generally be an electronic control unit suitable to provide catheter procedure system 100 with the various functionalities described herein. For example, controller 134 may be an embedded system, a dedicated circuit, a general-purpose system programed with the functionality described herein, etc. Controller 134 is in communication with one or more bedside systems 110, controls 118, monitors 120 and 122, imaging system 104 and patient sensors 136 (e.g., electrocardiogram ("ECG") devices, electroencephalogram ("EEG") devices, blood pressure monitors, temperature monitors, heart rate monitors, respiratory monitors, etc.). In an example embodiment, controller 134 may also be in communication with a contrast injection system 152 and an intravascular ultrasound (IVUS) system 154. Controller 134 may also be in communication with other medical systems 156 such as, for example, an OCT system, an FFR system, or aspiration pump. In various example embodiments, controller 134 is configured to generate control signals based on the user's interaction with controls 118 and/or based upon information accessible to controller 134 such that a medical procedure may be performed using catheter procedure system 100. In addition, controller 134 may be in communication with a hospital data management system or hospital network 142 and one or more additional output devices 138 (e.g., printer, disk drive, cd/dvd writer, etc.).

Communication between the various components of catheter procedure system 100 may be accomplished via communication links 140. Communication links 140 may be dedicated wires or wireless connections. Communication links 140 may also represent communication over a network. Catheter procedure system 100 may be connected or configured to include any other systems and/or devices not explicitly shown. For example, catheter procedure system 100 may include image processing engines, data storage and archive systems, automatic balloon and/or stent inflation systems, medicine injection systems, medicine tracking and/or logging systems, user logs, encryption systems, systems to restrict access or use of catheter procedure system 100, etc.

As mentioned, controller 134 is in communication with bedside system 110 and may provide control signals to the bedside system 110 to control the operation of the motors and drive mechanisms used to drive the percutaneous intervention devices (e.g., guide wire, catheter, etc.). The bedside system 110 may include, for example, a guide wire axial drive mechanism that provides for advancement and/or retraction of a guide wire, a working catheter axial drive mechanism that provides for advancement and/or retraction of a working catheter and a guide wire rotational drive mechanism that is configured to cause a guide wire to rotate about its longitudinal axis. In an example embodiment, the various drive mechanism are housed in a drive assembly 114 (shown in FIG. 1).

A robotic medical device system such as the example catheter procedure system described above with respect to FIGS. 1 and 2 may be controlled remotely.

Figure 3:
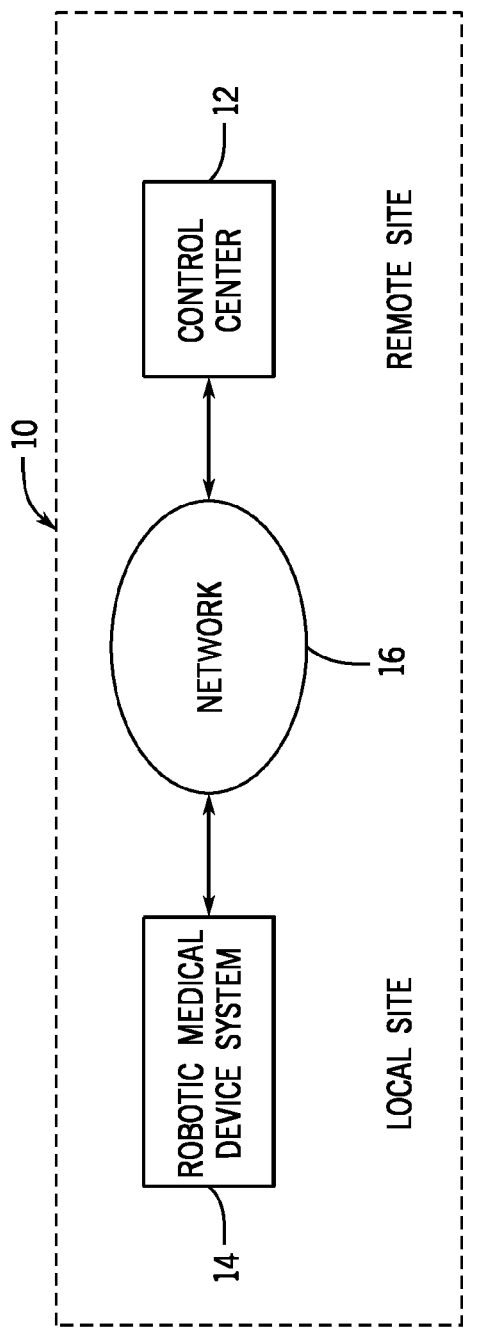
FIG. 3 is a block diagram of a communications and control system for a robotic medical device system in accordance with example embodiments.

FIG. 3 is a perspective view of a communications and control system for a robotic medical device system in accordance with an example embodiment. The communication and control system 10 includes a control center 12 at a remote site or location and a robotic medical device system 14 at a local site or location. As used herein, the local site is the location of the robotic medical device system and a patient or subject and the remote site is the location of an operator (e.g., a doctor) and a control center used to control the robotic medical device system remotely. The control center 12 and the robotic medical device system 14 are in communication over a network 16 such as, for example, the Internet. In an example embodiment, the remote site and the local site are away from one another, for example, different rooms in the same building, different buildings in the same city, different cities, or other different locations where the remote site does not have physical access to the robotic medical device system or patient at the local site. The control center 12 and robotic medical device system 14 communicate (e.g., data, images, command and control signals) over the network 16.

An operator at the remote site may use the control center 12 to control and operate the robotic medical device system 14 at the local site to perform a medical procedure. In an example embodiment, multiple control centers 12 may be in communication with one robotic medical device system 14 via network 16 and each control center 12 may be used to control the robotic medical device system 14 from a separate location. In another example embodiment, multiple control centers 12 may be in communication with multiple robotic medical device systems 14 via network 16 where each of the control centers 12 may be used to control each of the robotic medical device systems 14.

The robotic medical device system 14 may be, for example, a catheter procedure system or other medical device system that may be robotically controlled to perform a procedure. In an example embodiment, network 16 is a secure network such as, for example, a virtual private network (VPN). Control center 12 may include, for example, a workstation with a user interface. In an example embodiment, the control center 12 includes a user interface that is similar to a user interface provided in the robotic medical device system 14. For example, if the robotic medical device system 14 is a catheter procedure system such as the system described above with respect to FIGS. 1 and 2, the control center 12 may include a workstation with a user interface and controls similar to the workstation 116, user interface 126 and controls 118 of the catheter procedure system 100. In another example embodiment, the control center 12 includes a workstation or user interface that is part of a robotic medical device system at the remote site. The control center 12 is configured to allow an operator to operate various components of the robotic medical device system 14 from the remote site. Information such as data, images, and command and control signals are transmitted from the control center 12 over the network 16 to the robotic medical device system 14 and information such as data and images are transmitted from the robotic medical device system 14 over the network 16 to the control center 12.

Figure 4:
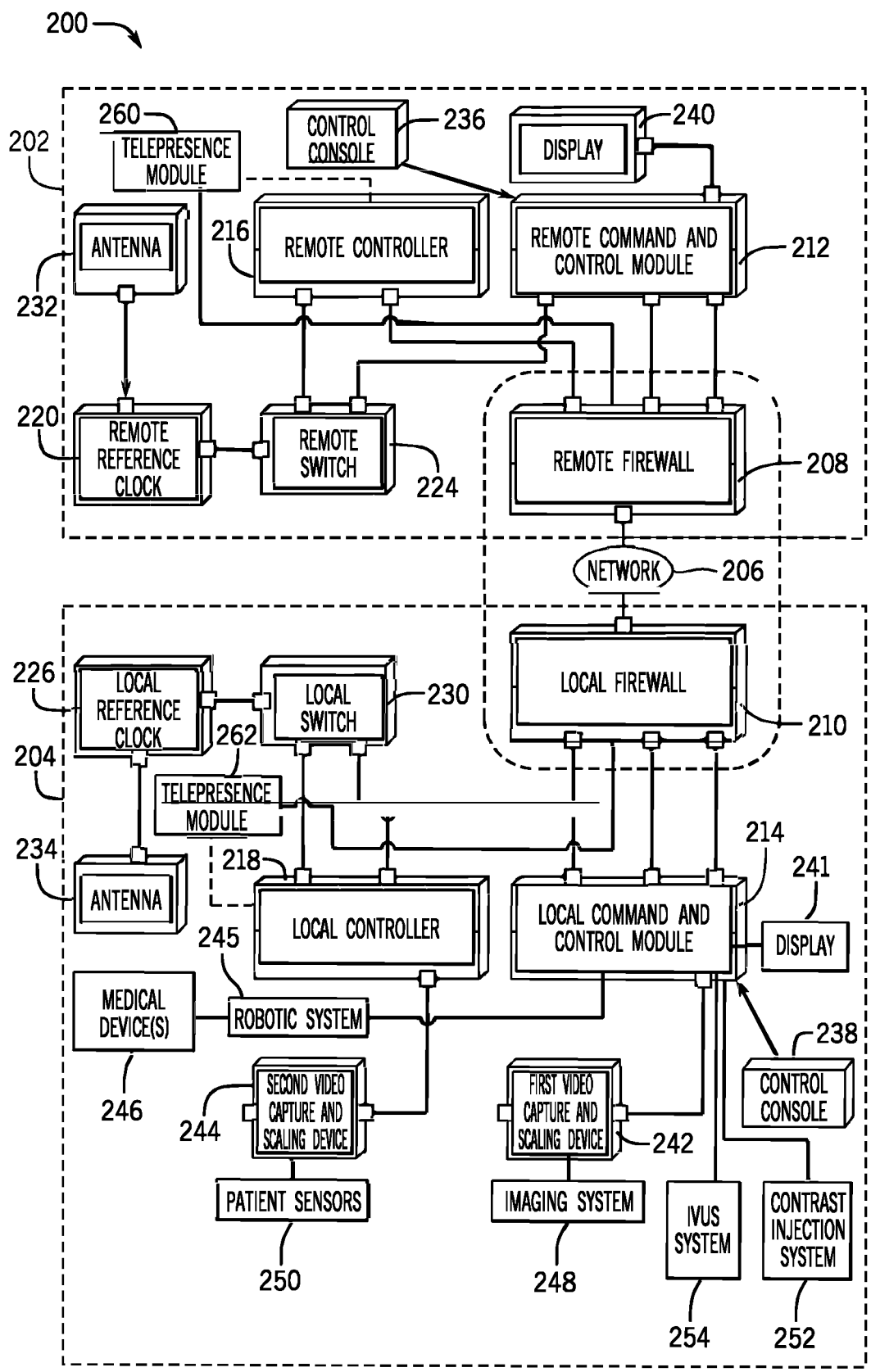
FIG. 4 is a block diagram of a communications and control system for a robotic medical device system in accordance with example embodiments.

FIG. 4 is a block diagram of a communications and control system for a robotic medical device system in accordance with example embodiments. The communications and control system 200 includes a control center 202 at a remote site and a robotic medical device system 204 at a local site. The control center 202 and the robotic medical device system 204 are in communication over a network 206. The network may include or be in communication with a NTP (Network Time Protocol) pool. In an example embodiment, the network 206 is a secure network established with a remote firewall 208 in the control center 202 and a local firewall 210 in the robotic medical device system 204. For example, the network 206 may be a VPN. The network 206 is configured to receive and transmit data, images, and command and control signals. In the system 200 shown in FIG. 4, one control center 202 and one robotic medical device system 204 are shown. In an example embodiment, multiple control centers 202 may be in communication with one robotic medical device system 204 via network 206 and each control center 202 may be used to control one or more medical devices 246 using a robotic system 245 in the robotic medical device system 204 from a separate location. The robotic system 245 may be, for example, a robotic arm, a robotic drive and/or other robotic device that can be used to drive a medical device. In an example embodiment where the robotic medical device system is a catheter system, the robotic system 245 may be a robotic arm 112 and a drive assembly 111 as described above with respect to FIG. 1. In another example embodiment, multiple control centers 202 may be in communication with multiple robotic medical device systems 204 via network 206 where each of the control centers 202 may be used to control one or more medical devices 246 using a robotic system 245 in each of the robotic medical device systems 204.

Control center 202 also includes a remote command and control module 212 and a remote controller 216 coupled to and in communication with the remote firewall 208. In an example embodiment, the remote firewall 208, the remote command and control module 212 and the remote controller 216 are implemented on separate hardware (e.g., computer systems). In another example embodiment, the remote firewall 208, the remote command and control module 212 and the remote controller 216 are implemented as separate software components or logical subsystem components on the same computer system. In yet another example embodiment, the remote command and control module 212 and the remote controller 216 may be implemented in a single component (software and/or hardware) or logical subsystem component on the same or a distributed computer system. The remote command and control module 212 and the remote controller 216 may be referred to collectively as a controller or remote controller. The software components or logical subsystem components may be achieved using, for example, microkernels, virtual machines, or conventional operating systems with real time extensions. In another example embodiment, the remote controller 216 and the remote firewall 208 may be implemented as a software program executing on the remote command and control module 212. The remote command and control module 212 receives command and control signals from a control center control console 236. The control console 236 is configured to receive user inputs from an operator at the remote site for the operation of the robotic medical device system 204 and other systems and devices at the local sites. For example, control console 236 may include a display and controls such as a touch screen, one or more joysticks and buttons. A first display 240 in the control center 202 is coupled to the remote command and control module 212 and may be used to display data and images received from the robotic medical device system 204. Remote command and control module 212 may be configured to decompress images received from the robotic medical device system 204.

Remote command and control module 212 is also coupled to a time synchronization reference clock such as, for example, a remote reference clock 220 and receives time information from the remote reference clock 220. The remote reference clock 220 may be, for example, a grandmaster clock. As discussed further below, the time information may be used to calculate delays in the transmission of signals and data (e.g., command and control signals, and images) between the remote site and the local site. The remote reference clock 220 is coupled to an antenna 232 to receive time information from an external time source such as, for example, a satellite-based time source or an external network and to provide timestamp information to the remote command and control module 212. In an example embodiment, the time information is provided from a global positioning system (GPS). In another example embodiment, the time information is provided from a satellite time and location (STL) system. A remote switch 224 may be coupled to the remote reference clock 220. In an example embodiment, the remote reference clock 220, the remote switch 224 and the remote command and control module 212 use a precision time protocol (PTP) network. Remote command and control module 212 uses the timestamp information from the remote reference clock 220 to timestamp the command and control signals received from the control console 236. The timestamped command and control signals may be transmitted via network 206 to a local command and control module 214 in the robotic medical device system 204. The local command and control module 214 is configured to provide the command and control signals over network 206 to, for example, a robotic system 245 in the robotic medical device system 204 to control the operation of the medical device(s) 246. The timestamp provided on the command and control signals by the remote command and control module 212 based on the information from the remote reference clock 220 may be used to monitor and control delays in the transmission of the command and control signals over the network 206 during a medical procedure performed using the medical device(s) 246. The local command and control module 214 is configured to determine the delay in receiving the command and control signals from the control center 202 based on the timestamps and to take appropriate action based on the amount of delay, as discussed further below with respect to FIG. 5.

The local command and control module 214 and the local controller 218 are coupled to and in communication with the local firewall 210. In an example embodiment, the local firewall 210, the local command and control module 214 and the local controller 218 are implemented on separate hardware (e.g., computer systems). In another example embodiment, the local firewall 210, the local command and control module 214 and the local controller 218 are implemented as separate software components or logical subsystem components on the same computer system. In yet another example embodiment, the local command and control module 214 and the local controller 218 may be implemented in a single component (software and/or hardware) or logical subsystem component on the same or a distributed computer system. The local command and control module 214 and the local controller 218 may be referred to collectively as a controller or local controller. The software components or logical subsystem components may be achieved using, for example, microkernels, virtual machines, or conventional operating systems with real time extensions. In another example embodiment, the local controller 218 and local firewall 210 may be implemented as a software programs executing on the local command and control module 214. The local command and control module 214 may also receive command and control signals from a robotic medical device system control console 238. The control console 238 is configured to receive user inputs from an operator at the local site for the operation of the robotic medical device system 204 at the local site. For example, control console 238 may include a display and controls such as a touch screen, one or more joysticks and buttons. A display 241 is coupled to the local command and control module 214 and may be used to display data and images. Local command and control module 214 also receive images from an imaging system 248 and hemodynamic data from patient sensors 250. In an example embodiment where the robotic medical device system 204 is a catheter procedure system as described above with respect to FIGS. 2 and 3, the local controller 218 may be coupled to a display 120, 122 or touch screen 124. The images from imaging system 248 may be captured and scaled using a first video capture and scaling device 242 and the hemodynamic data may be captured and scaled using a second video capture and scaling device 244. Local command and control module 214 may be configured to compress the image data before transmission to the control center 202 and local controller 218 may be configured to compress the hemodynamic data before transmission to the control center 202. In another example embodiment, the local command and control module 214 is coupled to and receives data from an intravascular ultrasound (IVUS) system 254. Data from the IVUS system 254 may be transmitted to control center 202.

The local command and control module 214 is also coupled to a time synchronization reference clock such as, for example, a local reference clock 226 and receives time information from the local reference clock 226. The local reference clock may be, for example, a grandmaster clock. The time information may be used to calculate delays in the transmission of signals and data (e.g., command and control signals, and images) between the remote site and the local site. The local reference clock 226 is coupled to an antenna 234 to receive time information from an external time source such as, for example, a satellite-based time source and to provide timestamp information to the local command and control module 214. In an example embodiment, the time information is provided from a global positioning system (GPS). In another example embodiment, the time information is provided from a satellite time and location (STL) system. A local switch 230 may be coupled to the local reference clock 226. In at least one example embodiment, the local reference clock 226, the local switch 230 and the local command and control module 214 use a precision time protocol network. Local command and control module 214 uses the timestamp information from the local reference clock 226 to timestamp the image data received from the first video capture and scaling device 242. In another example embodiment, the local controller 218 may use the timestamp information from the local reference clock 226 to timestamp the hemodynamic data received from the second video capture and scaling device 244. The timestamped images and hemodynamic data may be transmitted via network 206 to the remote command and control module 212 in the control center 202.

Although shown in FIG. 4, the second video capture and scaling device 244 and patient sensors 250 may be omitted in other example embodiments.

The remote command and control module 212 is configured to provide the images to a display 240 in the control center 202 and the hemodynamic data to display 240 or another display in the control center 202. The timestamp provided on the images and hemodynamic data by the local command and control module 214 based on the information from the local reference clock 226 may be used to monitor and control delays in the transmission of the images and hemodynamic data over the network 206 during a medical procedure performed using the control center 202 to control the robotic system 245 and the medical device(s) 246. Various components of the system 200 may be paused or halted or control of the system passed between the control center 202 and the robotic medical device system 204 based on the delay in transmission of the images and/or hemodynamic data.

As described above, the control center 202 may include a remote reference clock 220 that may us a precision time protocol and the robotic medical device system 204 includes a local reference clock 226 that may use a precision time protocol. The remote reference clock 220 and local reference clock 226 may be in communication with a common external time source, for example, a satellite-based time source such as GPS or STL to receive time information. At least this example embodiment enables the control center 202 and the robotic medical device system 204 to communicate over a secure tunnel on a network 206 (e.g., the Internet) and compute the command delay and round trip delay in order to help ensure safe secure operations. Each site uses a dedicated reference clock (e.g., reference clock 220, 226, respectively) and an isolated Ethernet network for time synchronization. Either the NTP or the PTP may be used for synchronization in this example embodiment. By using a dedicated reference clock at each site over an isolated network, an attack surface for network attacks aimed at time references which are made accessible to the Internet may be reduced and/or eliminated. Such vulnerabilities include, but are not limited to, denial of service (DOS) which render the GMC unavailable, and stack overflow which render the command and control module under the control of an adversary. As discussed further below with respect to FIG. 16, in an example embodiment firewalls may be used to establish an IPSec encrypted tunnel with dedicated hardware between two nodes with privately held keys for relatively high levels of security and reduced (e.g., minimal) delay impact on communications.

In another example embodiment, the control center 202 and the robotic medical device system 204 may not include their own reference clock. Rather, the control center 202 and the robotic medical device system 204 may be configured to utilize a NTP and NTP pool in communication with a single network grandmaster clock to received time information. As mentioned above, the time information may be used to generate timestamps for command and control signals and other data (e.g., images and hemodynamic data). In at least one example embodiment, the timestamps are provided by a common time source (e.g., GPS or STL) to determine the delay in transmission of the sum of the command and control signals. In another example embodiment, the timestamps are provided by a single time source (e.g., a network grandmaster clock or an internal clock) to determine the delay in the transmission of the sum of the command and control signals. In this example embodiment, the timestamp from the "remote" site would be used and then the roundtrip command and control signal and image delay would be computed when the timestamp is received back from the image transmission from the "local" site.

As mentioned above, the control center 202 may be used by an operator at the remote site to operate and control the robotic medical device system 204 and other systems and devices at the local site. In an example embodiment, the control center 202 may provide command and control signals over the network 206 to imaging system 248 or a contrast delivery system 252. For example, control center 202 may be used to control image capture by the imaging system 248. In another example, control center 202 may be used to control contrast injection by contrast injection system 252. In other examples, control center 202 may be used to control the actuation of an aspiration pump or the deployment of a stent retriever.

Control center 202 incudes a telepresence module 260 and the robotic medical device system 204 includes a telepresence module 262. Each telepresence module 260, 262 is configured to provide audio and video communication (e.g., telepresence, teleconference) between an operator at the remote site and a user or local staff at the local site. In at least one example embodiment, as shown in FIG. 4, telepresence modules 260, 262 are standalone modules and may be coupled to the remote firewall 208 and local firewall 210, respectively. In at least one other example embodiment, elements of the telepresence modules 260, 262 may be a software program executing on the remote controller 216 or the local controller 218, respectively. Telepresence modules 260 and 262 may include, for example, a video camera, monitors, speakers and microphone(s). In one example embodiment, a video conference may be established between telepresence module 260 at the remote site and the telepresence module 262 at the local site so that the operator at the remote site utilizing the control center 202 to operate the medical device(s) 246 using the robotic system 245 at the local site may view the procedure room and equipment as the procedure is performed and communicate via audio and video with personnel (e.g., as technician, a physician, etc.) supporting the procedure at the local site. In an example embodiment, audio and video communication may be established between the telepresence module 260 at the remote site and the telepresence module 262 at the local site using a dedicated audio and video communication system, which establishes secure communication over a computer network (e.g., a cloud network). For example, the telepresence module 260 at the remote site may be configured to transmit the audio (e.g., speech) and video from the remote site in an encrypted format (e.g., SRTP/AES-128) and configured to receive and decrypt audio (e.g., speech) and video from the telepresence module 262 at the local site. The telepresence module 262 at the local site may be configured to transmit the audio (e.g., speech) and video from the local site in an encrypted format (e.g., SRTP/AES-128) and configured to receive and decrypt audio (e.g., speech) and video from the telepresence module 260 at the remote site. Signaling and routing between the telepresence module 260 and the telepresence module 262 may be established using a cloud network. In at least one example embodiment, the encrypted audio and video data may be transmitted between the remote firewall 208 and the local firewall 210 without further encryption (e.g., the audio and video data may be whitelisted).

Figure 5:
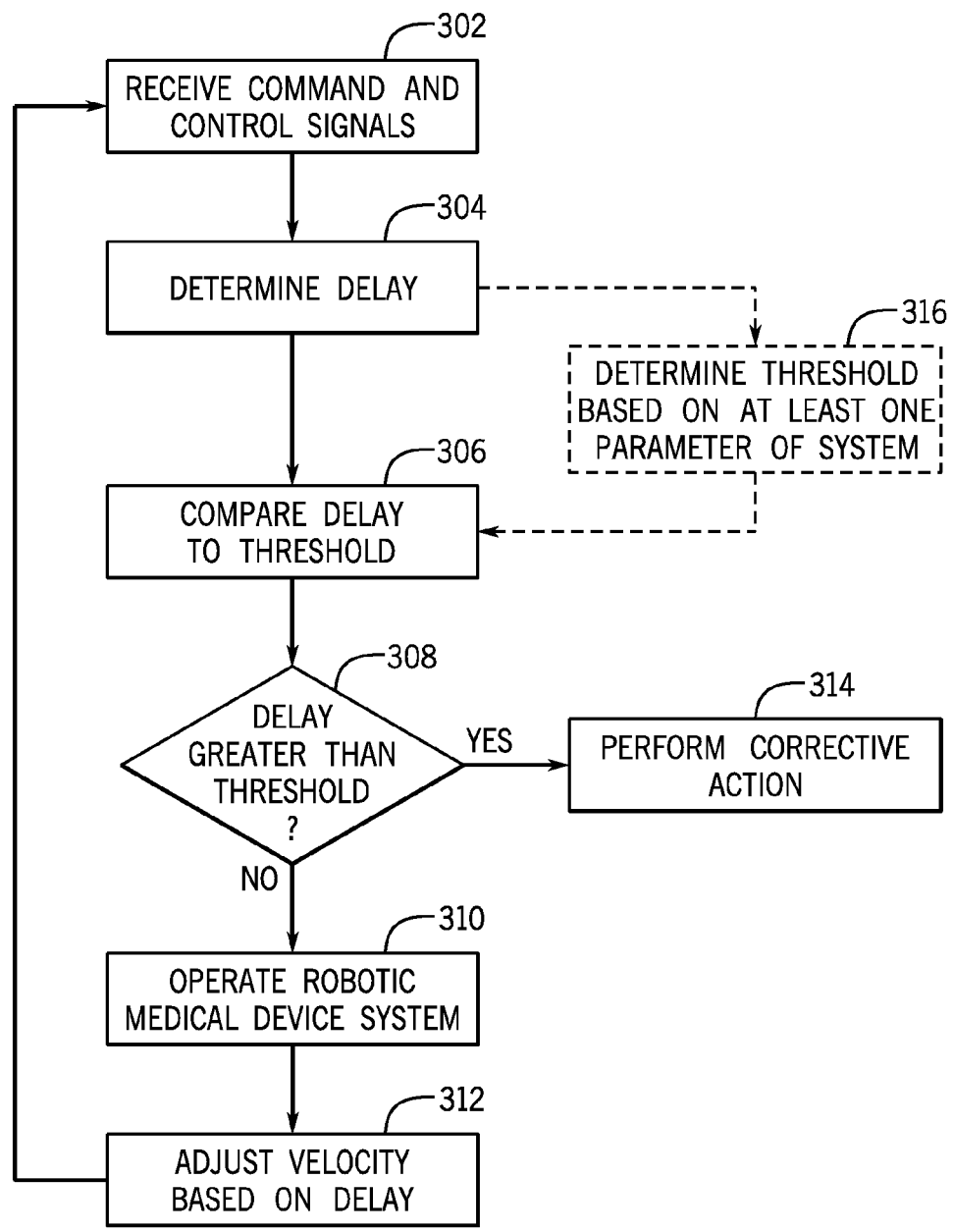
FIG. 5 illustrates a method for controlling operation of a robotic medical device system in accordance with example embodiments.

FIG. 5 illustrates a method for controlling operation of a robotic medical device system in accordance with example embodiments.

Referring to FIGS. 4 and 5, at block 302 command and control signals are received by, for example, the local command and control module 214 at the local site from the control center 202 at the remote site.

At block 304, the delay in receiving the command and control signals is determined, for example, by the local command and control module 214 based on the timestamp information.

At block 306, the delay is compared to a threshold value. In an example embodiment, the threshold is a given (or, alternatively, desired or predetermined) value, for example, based on what is perceptible to a user. In one example, the threshold may be 250 ms. In another example embodiment discussed further below, the threshold may be determined at block 316 based on at least one parameter of the robotic medical device system, for example, the procedure being performed by the robotic medical device system, patient anatomy, type of medical device, and location of the medical device.

At block 308, if the delay is greater than the threshold corrective action may be performed at block 314. In at least one example embodiment, the medical device(s) 246 and other components of the robotic medical device system 204 may be paused or stopped. In one example of a pause, if the delay is greater than the threshold value and then the delay goes below the threshold, the device or component may be paused and then start moving again once the delay goes above the threshold value. In another example, if the delay is too large, the movement of the device or component may be paused until the delay becomes low enough to resume operation. In another example embodiment, the speed or velocity (e.g., during advancement, retraction or rotation) of components of the robotic medical device system may be slowed down. If the network connection has been lost or the speed of the network 206 has slowed below a given (or, alternatively, desired or predetermined) rate, the control center 202 may give control of the robotic system 245 and the medical device(s) 246 back to the robotic medical device system 204. An emergency stop may also be provided so that a user at the local site may stop the procedure for an emergency. In an example embodiment, the threshold is a range of threshold values. If the control center 202 has control of the robotic system 245 and the medical device(s) 246 and the delay of the command and control signals is greater than a first threshold and less than a second threshold, the control console 236 (e.g., a joystick) of the control center 202 may be disabled but the control console 236 maintains control of the robotic system 245 and the medical device(s) 246. If the control center 202 has control of the robotic system 245 and the medical device(s) 246 and the delay of the command and control signals is greater than the second threshold, then the control center 202 may be disabled.

At block 308, when the control center 202 has control of the robotic system 245 and the medical device(s) 246 if the delay of the command and control signals is less than the threshold, the control console 236 of control center 202 may be used to control and operate the robotic medical device system 204 including the robotic system 245 and the medical device(s) 246 at block 310.

At block 312, the velocity of the medical device 246, as it is being controlled by the control center 202, may be adjusted based on the delay of the command and control signals. If the control center 202 has control of the robotic system 245 and the medical device 246 and the delay ($t_{delay}$) of the command and control signals is less than a defined threshold amount ($t_{predetermined}$) and greater than zero, the commanded velocity ($v_{command}$) from the command and control signals received from the control console 236 (e.g., a joystick) is scaled so that the velocity of the device 246 ($v_{device}$) decreases as the delay increases towards the threshold amount. In this example embodiment, the velocity of the device may be given by equation (1) shown below.

$$v_{device} = v_{command} \times \frac{\max(t_{predetermined} - t_{delay}, 0)}{t_{predetermined}} \qquad (1)$$

For example, if the delay $t_{delay}$ is equal to half of the threshold amount, $t_{predetermined}$, then the velocity of the device $v_{device}$ will be half of the commanded velocity $v_{command}$. Slowing the device 246 down as delay $t_{delay}$ increases may help ensure stability of the system and mitigate risk associated with device control, for example, to avoid advancing or retracting the device excessively. If the delay $t_{delay}$ is greater than the threshold amount $t_{predetermined}$ (block 308), then the velocity of the device $v_{device}$ is zero and movement of the device 246 is stopped (block 314). In another example embodiment, the velocity of the device $v_{device}$ may be adjusted based on the total network delay. The total network delay includes the delay of the command and control signals $t_{delay}$ and the delay of images received from the robotic medical device system 204 $t_{imagedelay}$. In this example, the velocity of the device $v_{device}$ may be given by equation (2) shown below.

$$v_{device} = v_{command} \max(t_{predetermined} - (t_{delay} + t_{imagedelay}), 0)/t_{predetermined} \qquad (2)$$

Scaling the commanded velocity $v_{command}$ of the device based on the total network delay $t_{total} = (t_{delay} + t_{imagedelay})$ may ensure stable operation and robust performance for positional control of the device. One or more example embodiments for scaling the commanded velocity given above may be tuned to ensure stability despite any total delay. If the delay is unknown, then instabilities may occur if the delay is too large.

The frequency response for the open loop system under fixed total delay may be given by equation (3) shown below.

$$H(j\omega) = \frac{1}{\omega} e^{-j(\frac{\pi}{2} + \omega t_{total})} \qquad (3)$$

From the Nyquist stability criteria, in order for stability to be ensured for unity proportional feedback, the total network delay must satisfy the following constraint:

$$t_{total} \leq \frac{\pi}{2}$$

seconds. Using the scaling in equation (2) above, in which the threshold value $$t_{predetermined} \frac{\pi}{2},$$

results in the frequency response given by equation (4) shown below.

$$H(j\omega) = \frac{\frac{\pi}{2} - t_{total}}{\frac{\pi}{2}\omega} e^{-j(\frac{\pi}{2} + \omega t_{total})} \qquad (4)$$

In other example embodiments, other optimal values for the threshold value $t_{predetermined}$ may be calculated and used in the scaling of equation (2). From equation (4), the stability may be ensured for proportional unity feedback as the gain margin is now infinity for unity proportional feedback. Other methods may be used in a similar manner with the knowledge of the feedback delay to ensure stability. An example of an approach to use wave variables to ensure stability without knowledge of the feedback delay as well when using velocity commands to control the position of the device is described in "Design of Networked Control Systems Using Passivity," N. Kottenstette, J. F. Hall, X. Koutsoukos, J. Sztipanovits and P. Antsaklis, IEEE Transactions on Control Systems Technology, vol. 21, no. 3, pp. 649-665, May 2013, incorporated herein by reference in its entirety.

As mentioned above, at block 316, the delay threshold may be determined based on at least one parameter of the robotic medical device system 204 including, for example, the procedure being performed by the robotic medical device system. For example, the robotic medical device system 204 may be a catheter procedure system that controls the movement and operation of elongated medical devices (e.g., catheters, guidewires, balloon catheters, microcatheters, etc.). The amount of delay that is acceptable may vary depending on various parameters of the catheter procedure system. The value of the delay threshold may be based on, for example, the type of procedure being performed, the patient anatomy, the type of elongated medical device (e.g., catheter, balloon catheter, guide catheter, guidewire, microcatheter, or the like), the location of the elongated medical device, the distance between the elongated medical device (e.g., the tip or distal end of the device) and a target location, or the type of movement begin performed by the elongated medical device (e.g., advancement, rotation, retraction, etc.). For example, more delay may be tolerated when the elongated medical device (e.g., the tip of the elongated medical device) is further away from the target location, when the elongated medical device is being retracted or if the elongated medical device is a device that travels on a wire (e.g., a microcatheter or balloon catheter) or a guidewire.

In at least one example embodiment, the remote controller 216 (shown in FIG. 4) and the local controller 218 (shown in FIG. 4) each generate and display a similar graphical user interface.

Figure 6:
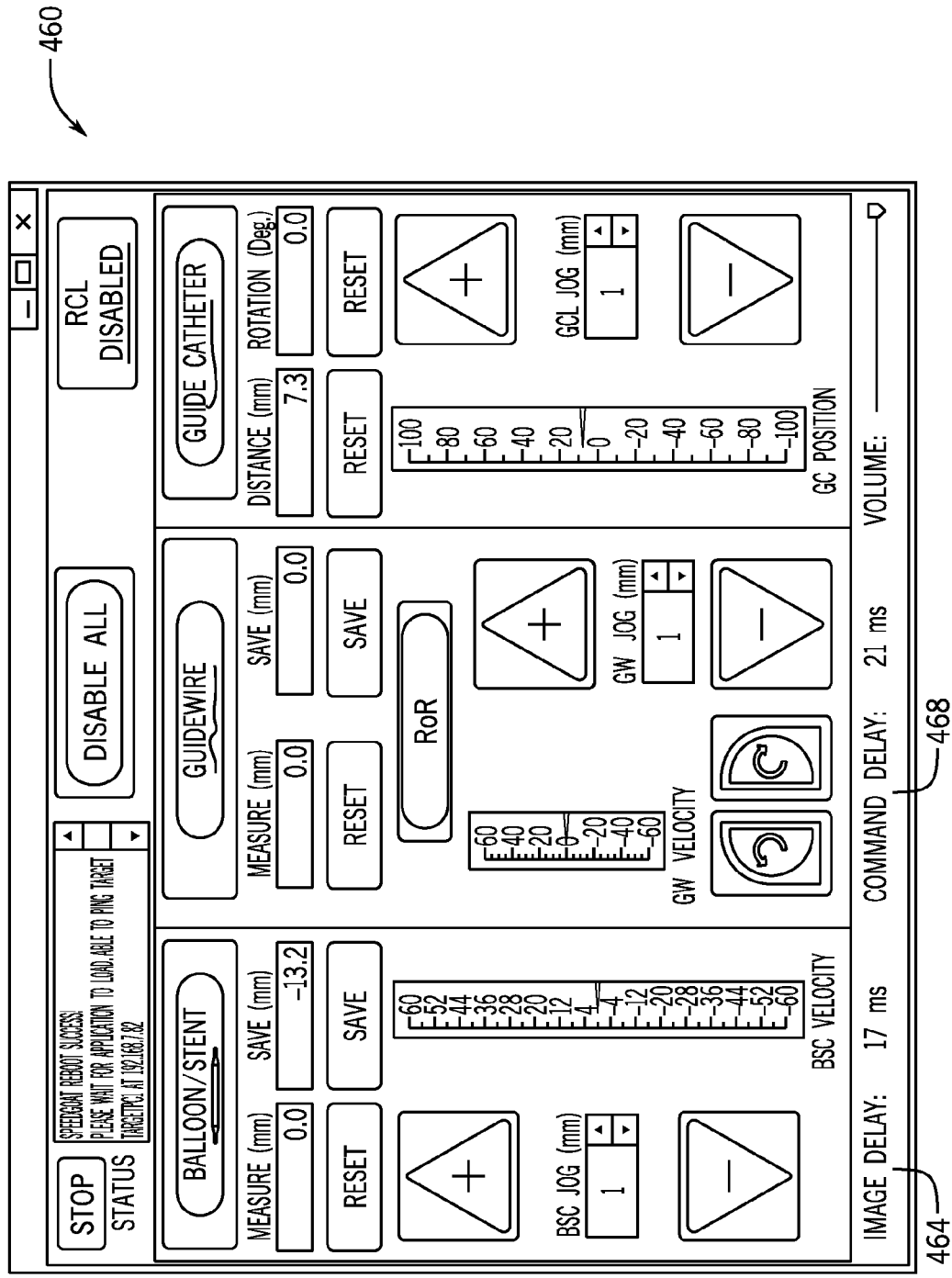
FIG. 6 shows an example graphical user interface for a control center in accordance with example embodiments.
Figure 7:
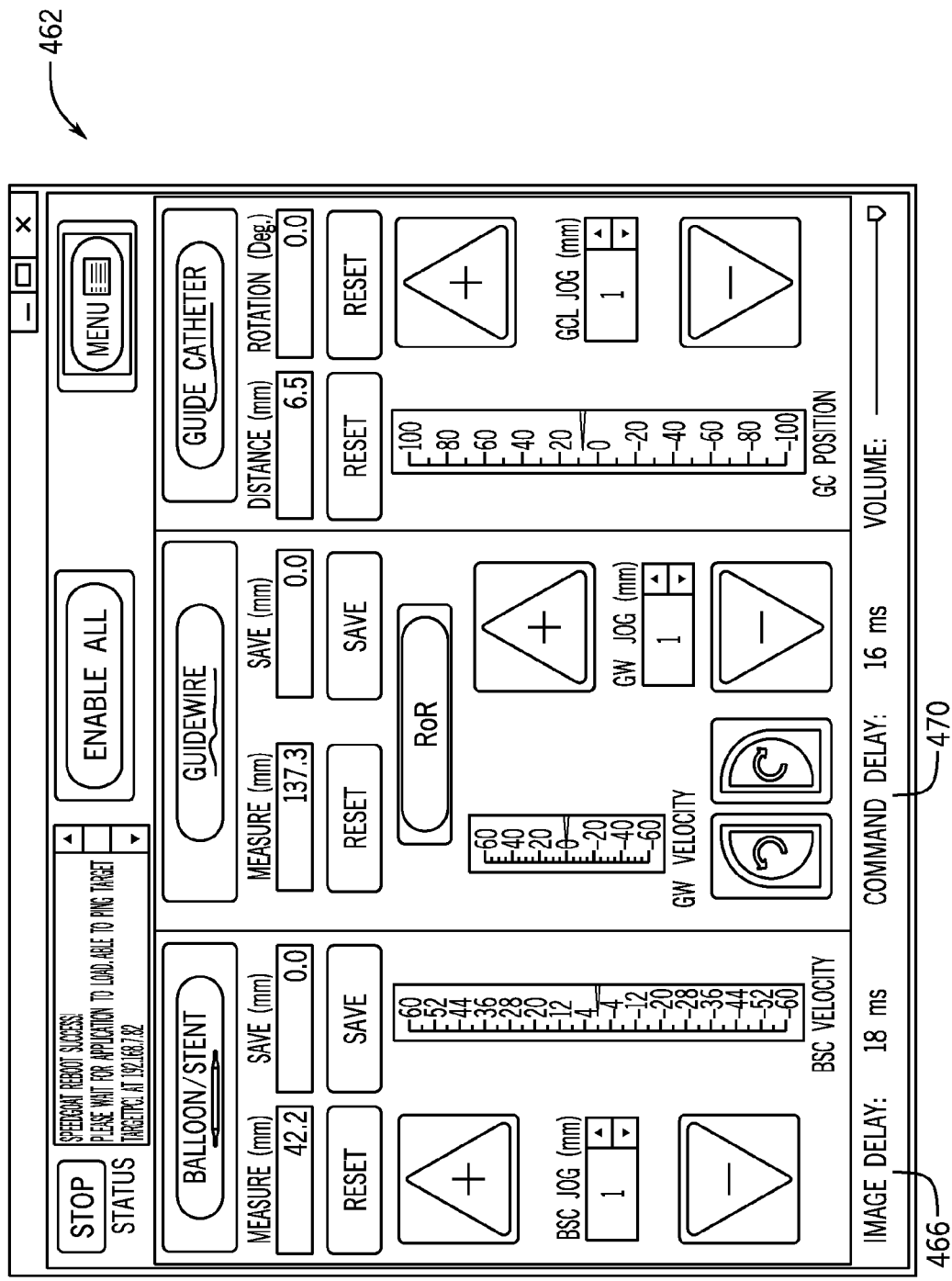
FIG. 7 shows an example graphical user interface for a robotic medical device system in accordance with example embodiments.

FIG. 6 shows an example graphical user interface for a control center in accordance with example embodiments. FIG. 7 shows another example graphical user interface for a robotic medical device system in accordance with example embodiments.

In FIGS. 6 and 7, the graphical user interfaces 460, 462 are for control of an example catheter procedure system. The graphical user interface 460 for a control center and the graphical user interface 462 for a robotic medical device system are configured to show, for example, the same measurements, velocities, saved settings and which control of a control console is being actuated at the active site (e.g., either the control center at the remote site or the robotic medical device system at the local site). Each graphical user interface 460, 462 displays the delay 464, 466 of the transmitted images from the robotic medical device system to the control console and the delay 468, 470 of the command and control signals from the control center to the robotic medical device system.

As discussed above with respect to FIG. 4, a display 240 of the control center 202 may be used to display data and images received from the robotic medical device system 204 over network 206.

Figure 8:
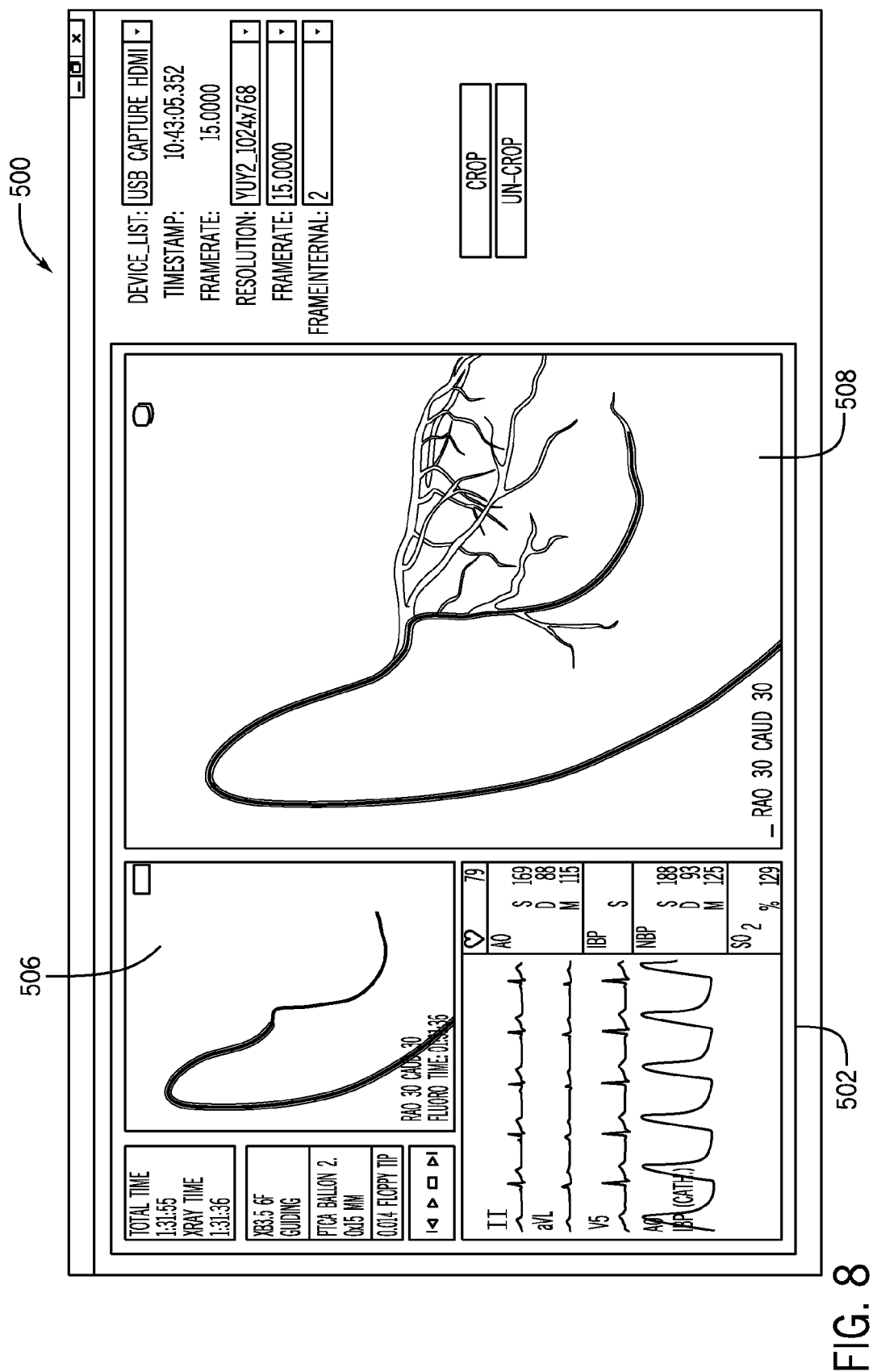
FIG. 8 shows an example display of data and images for the robotic medical device system at the local site in accordance with example embodiments.

FIG. 8 shows an example display of data and images for the robotic medical device system in accordance with example embodiments.

Referring to FIG. 8, the display 500 includes data and images captured at the robotic medical device system 204, such as, for example, hemodynamic data 502, a reference image 506 and a live image 508 related to the operation of a robotic medical device to perform a procedure. In particular, in the example embodiment shown in FIG. 8, the data and images relate to a catheter procedure. The robotic medical device system 204 may be configured to select a section or region of interest of the display 500 for transmission to the control center 202 at the remote site.

Accordingly, the display 500 may be cropped so that, for example, the hemodynamic data 502, reference image 506 and live image 508 may be transmitted separately. The selected section or region of interest may have any shape to capture the desired information for transmission. Cropping the display 500 may reduce the bandwidth required to transmit the images and data.

Figure 9:
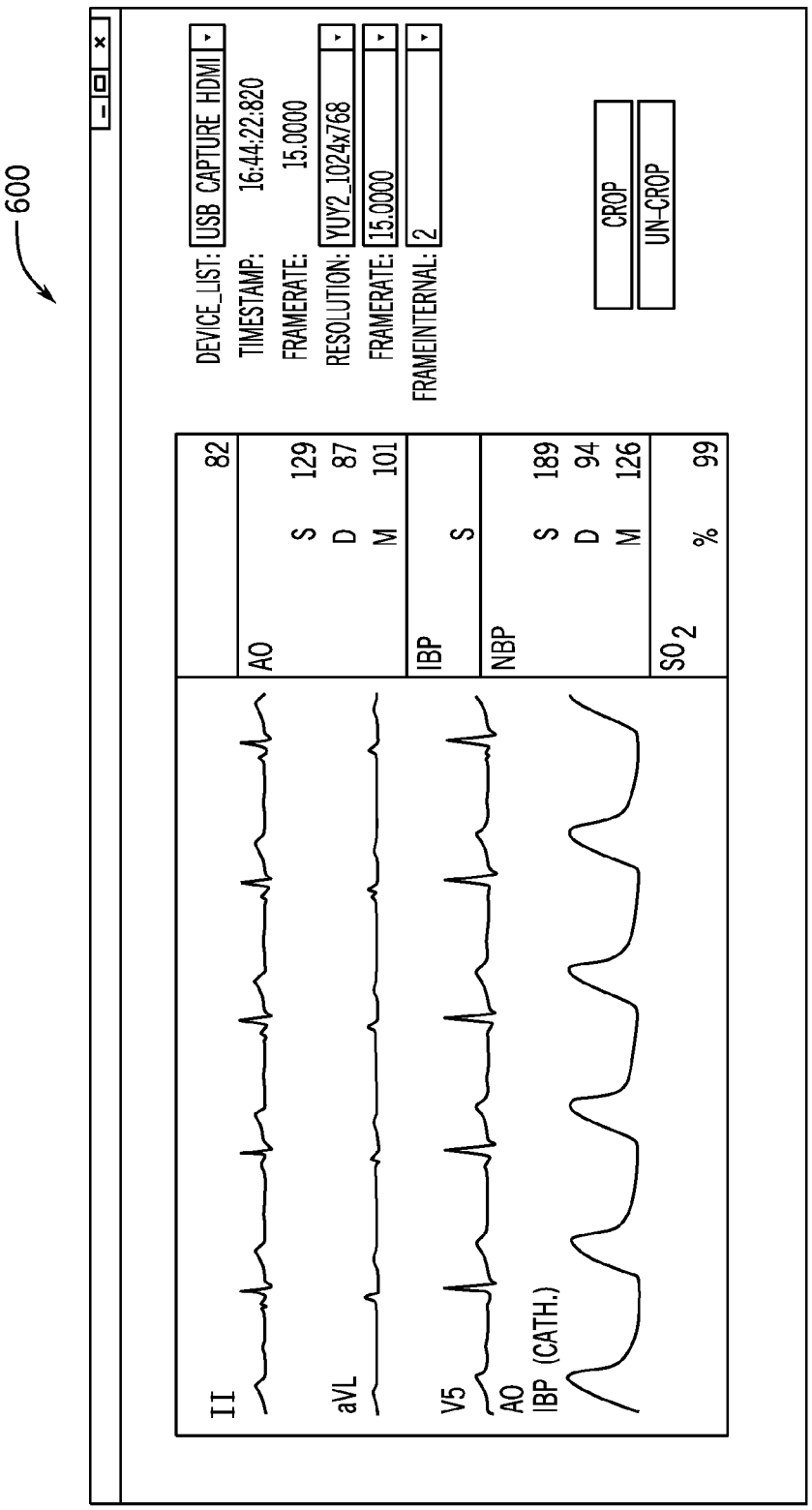
FIG. 9 shows an example display for the control center at the remote site having hemodynamic data in accordance with example embodiments.

FIG. 9 shows an example display for the control center at the remote site having a selected region of interest including hemodynamic data in accordance with example embodiments.

In FIG. 9, a display 600 includes hemodynamic data received from the robotic medical device system 204.

Figure 10:
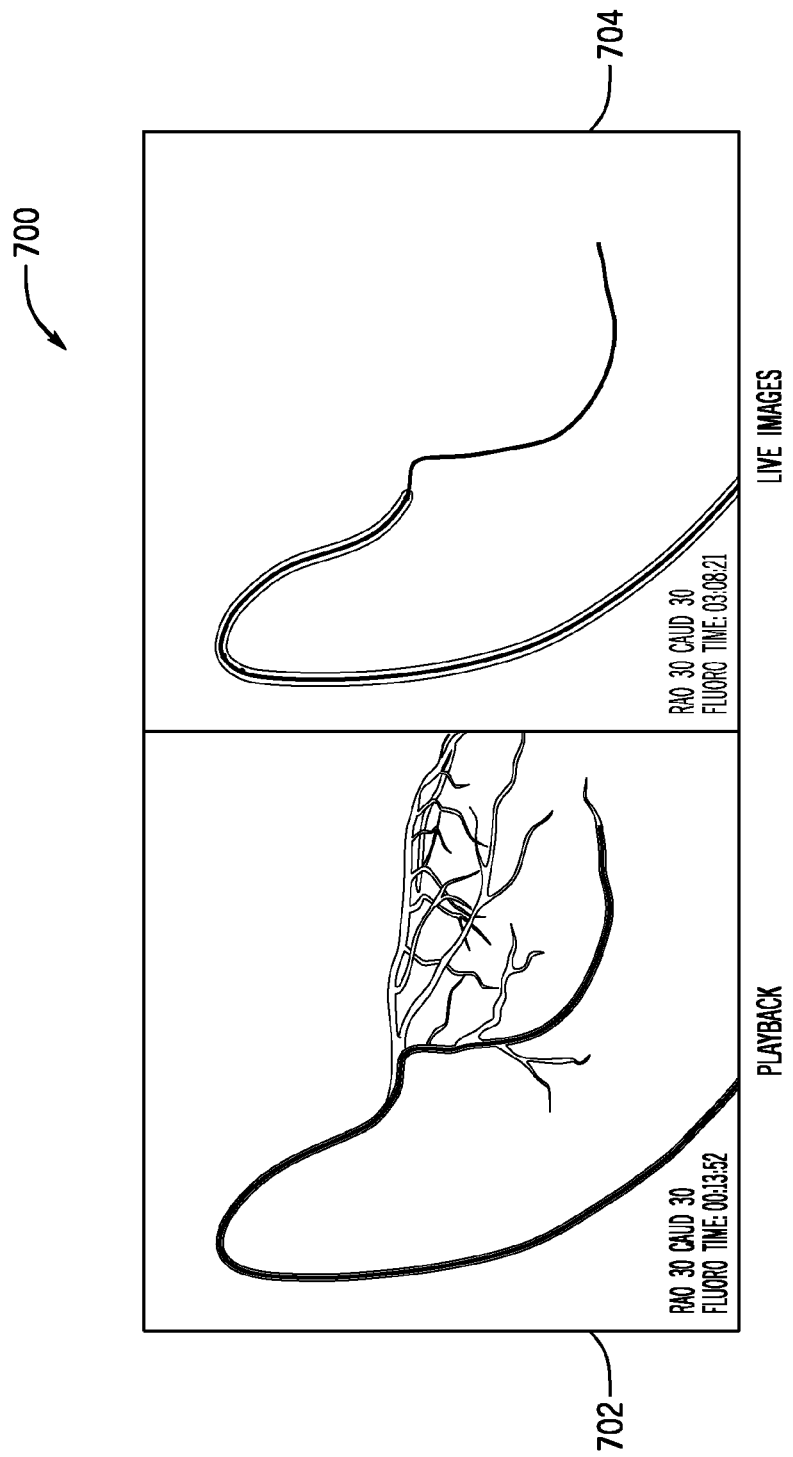
FIG. 10 shows an example display for the control center at the remote site in accordance with example embodiments.

In another example embodiment, the remote controller 216 and display 240 may be configured to allow an operator to selectively circular buffer up to a given (or, alternatively, desired or predetermined time) (e.g., 10 seconds) of the live image data (e.g., a fluoroscopic image data for a catheter procedure) as shown in FIG. 10. For example, a user may actuate a control to start the capture and create the circular buffer for the predetermined time for playback. In the example embodiment shown in FIG. 10, the playback image shown in the display 700 is scaled to be the same scale as the live image 704. The playback 702 may be in real-time at a given (or, alternatively desired or predetermined) frames per second. In at least one example embodiment, controls are provided that allow an operator to pause, step forward and step back through the playback image 702.

The playback image may be used to, for example, facilitate generation of roadmaps and capture progression of the case.

Figure 14:
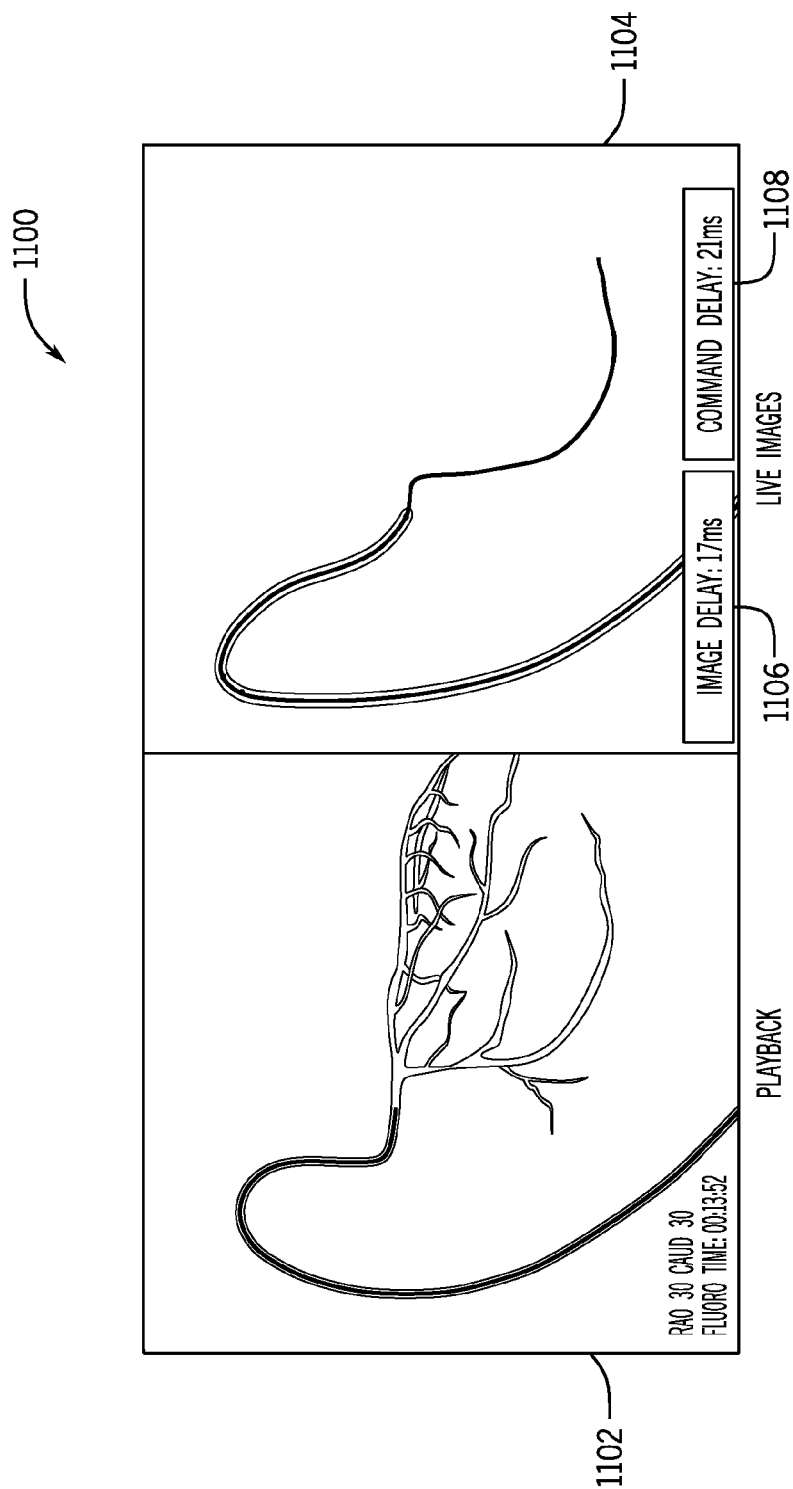
FIG. 14 shows an example display for the control center at the remote site in accordance with example embodiments.

In another example embodiment, a display of images at the remote site (e.g., on display 240 shown in FIG. 4) may be configured to display the image delay time and the command and control signal delay time as shown in FIG. 14.

Figure 15:
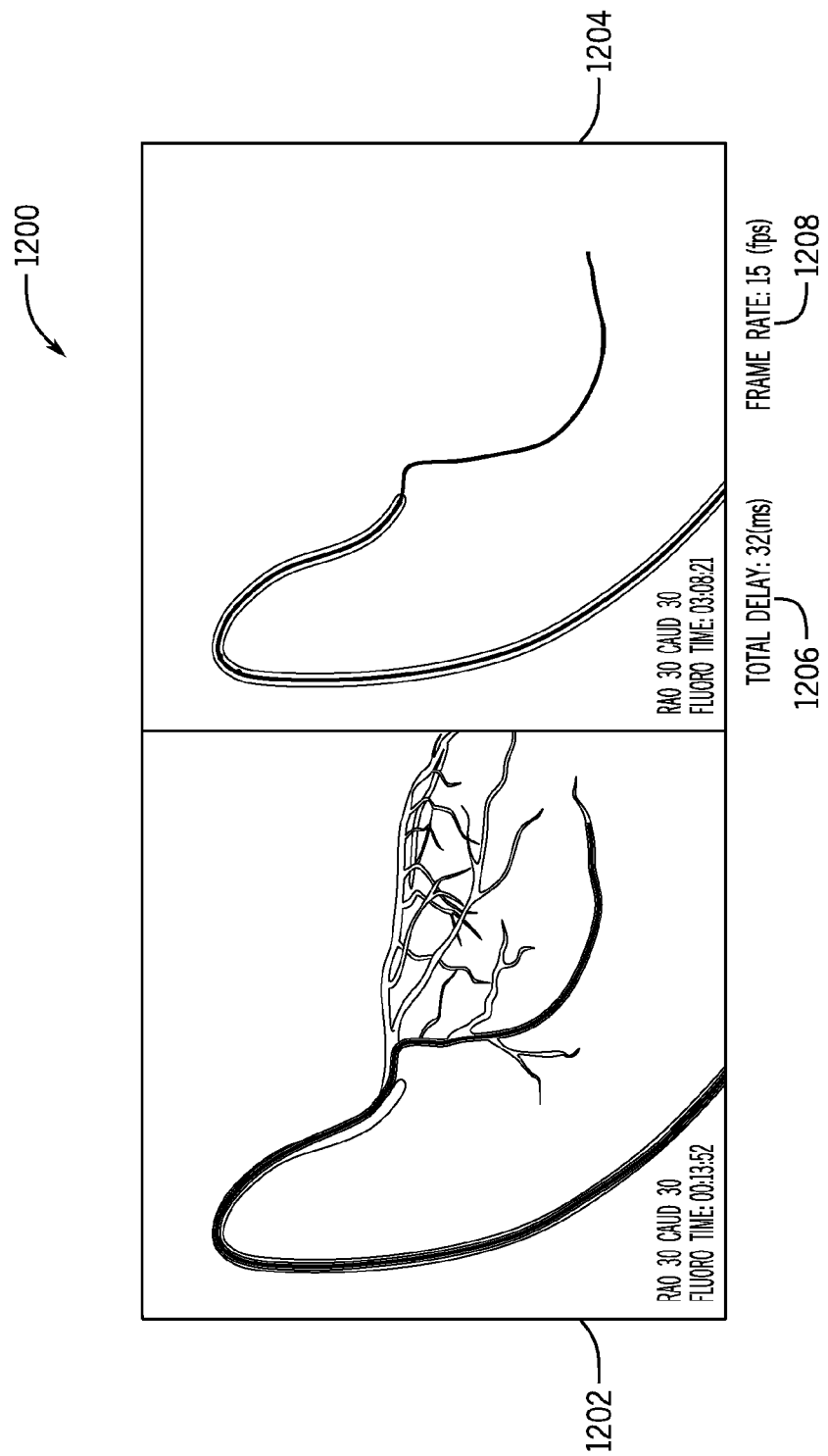
FIG. 15 shows an example display for the control center at the remote site in accordance with example embodiments.

In FIG. 14, a display 1100 includes a playback image 1102 and a live image 1104. The display of the live image includes a display of the delay 1106 of the transmitted images from the robotic medical device system to the control console and the delay 1108 of the command and control signals from the control center to the robotic medical device system. In another example embodiment, a display of images at the remote site (e.g., on display 240 shown in FIG. 4) may be configured to display the total delay as shown in FIG. 15. The total delay is the sum of the image delay time and the command and control signal delay time. In another example, the total delay may be displayed as a drop down overlay on the display 240.

In FIG. 15, a display 1200 includes a playback image 1202 and a live image 1204, which may include additional live information about the procedure such as the total delay and a frames rate for the images acquired by an imaging system associated with the robotic medical device system 204 at the local site. In at least one example embodiment, the playback image 1202 may be scrolled to a region of interest after the image is captured. The display of the live image 1204 includes a display of the total delay 1206 and the frames rate 1208. The frames rate 1208 may be computed in terms of received frames per second. The total delay 1206 and the frames rate 1208 may be updated in real-time and/or be filtered to an appropriate bandwidth in order to improve the perception for the viewer of these values.

As mentioned above with respect to FIG. 4, the communications and control system 200 is configured to allow an operator (e.g., a physician) at the remote site to control and operate the robotic medical device system 204 at the local site. The system 200 is also configured to allow an operator at the local site to control and operate the robotic medical device system 204. A control management process is provided to manage whether the control center 202 or the robotic medical device system 204 has control of the robotic system 245 and the medical device(s) 246. The control management system is configured to, for example, prevent deadlock between the remote site and the local site. In at least one example embodiment, a control token is used to determine whether the control center 202 or the robotic medical device system 204 has control of operations to perform a procedure. The control token is a virtual token implemented in software. The system (e.g., either the control center 202 or the robotic medical device system 204) that has possession of the control token is given control of the robotic system 245 and the medical device(s) 246 of the robotic medical device system 204 and the other system is disabled and prevented from controlling the robotic system 245 and the medical device(s) 246. In a first state, the control token is "free" and is available to be taken by either the control center 202 or the robotic medical device system 204.

Figure 11:
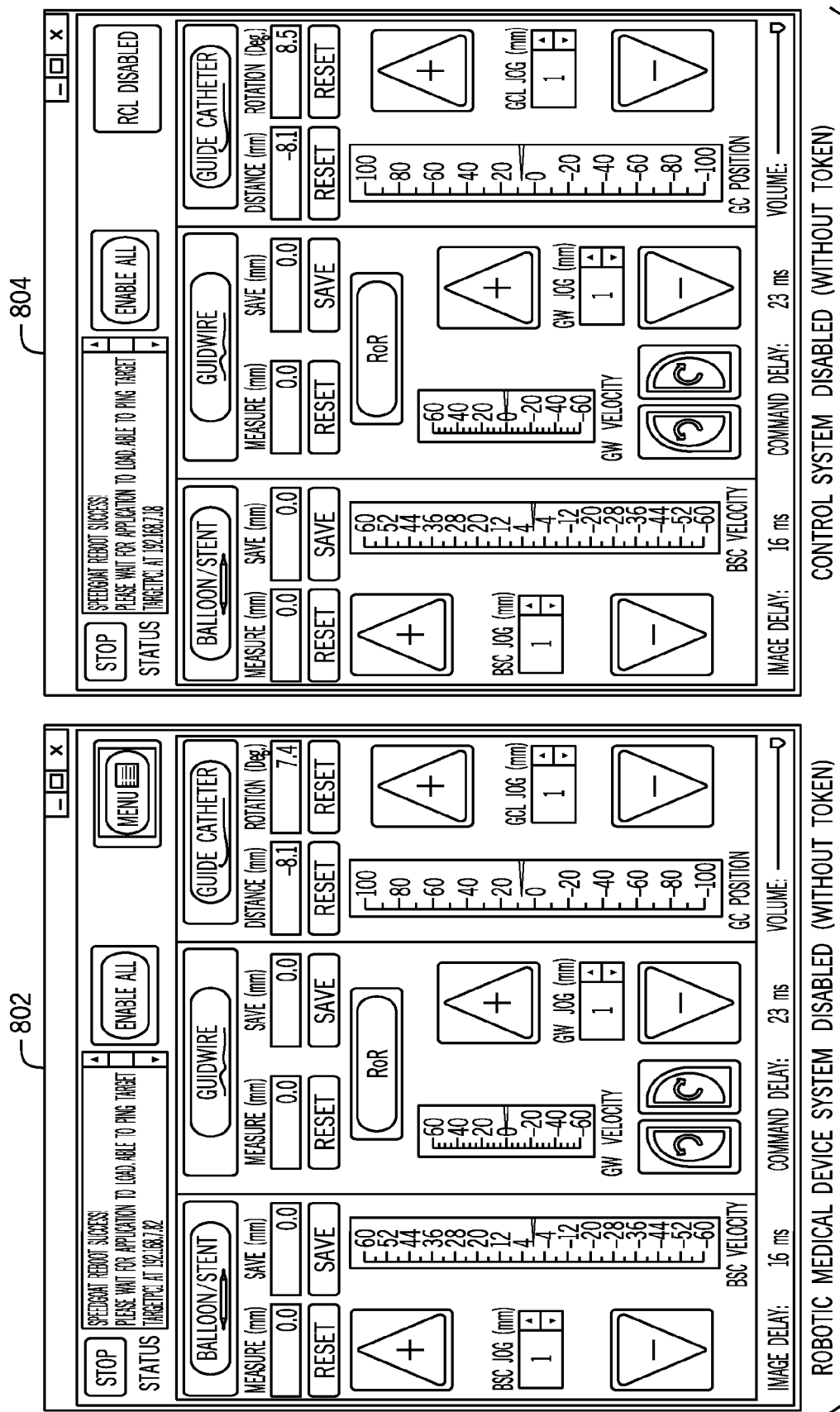
FIG. 11 shows example user interfaces when neither the control center or robotic medical device system is in control of the robotic medical device in accordance with example embodiments.

FIG. 11 shows example user interfaces when neither the control center or robotic medical device system are in control of the robotic medical device in accordance with an example embodiments. The graphical user interfaces 802, 804 shown are for control of an example catheter procedure system (e.g., catheter procedure system 100 shown in FIGS. 2 and 3). When the control token is "free," the robotic medical device system is without the control token and the robotic medical device system may take control by taking the control token by, for example, actuating an "Enable All" button in the graphical user interface 802 for the robotic medical device system. The control center is also without the control token and can take control by, for example, actuating a "RCL Disabled" button for the robotic medical device system in the graphical user interface 804 for the control center. In at least one example embodiment, the "Enable All" button of graphical user interface 804 may be shown with a background or color that indicates that the control center does not have control, for example, the text and background of the button may be greyed out.

In a second state, the control token has been taken by the robotic medical device system 204.

Figure 12:
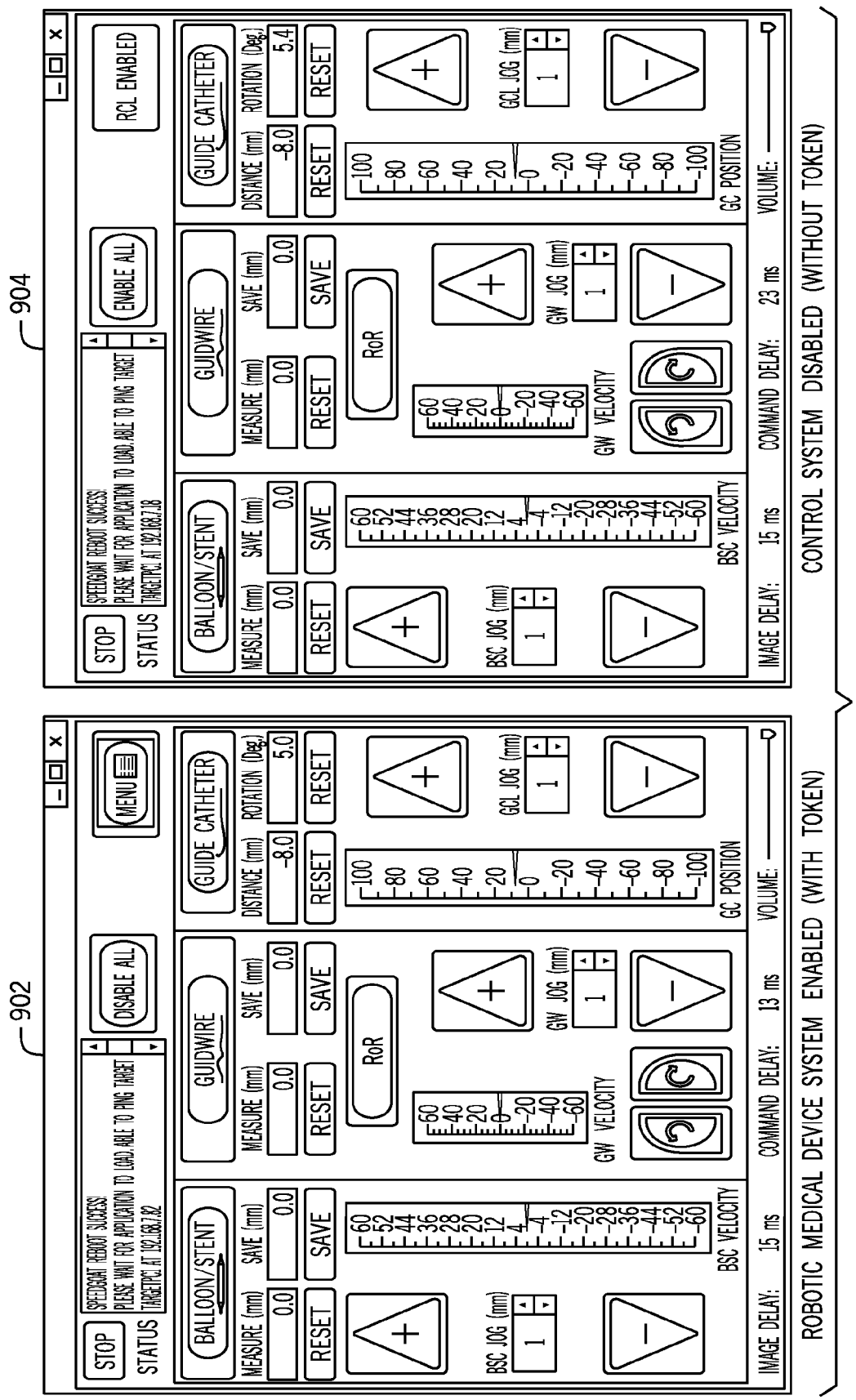
FIG. 12 shows example user interfaces when the robotic medical device system is in control of the robotic medical device in accordance with example embodiments.

FIG. 12 shows example user interfaces when the robotic medical device system is in control of the robotic medical device in accordance with example embodiments. The graphical user interfaces 902, 904 shown are for control of an example catheter procedure system (e.g., catheter procedure system 100 shown in FIGS. 2 and 3). When the control token has been taken by the robotic medical device system, the robotic medical device system is given control and may be used to operate the robotic medical device.

In FIG. 12, when the robotic medical device system has taken control with the control token, the "Enable All" button is disabled and changed to "Disable All" in graphical user interface 902 for the robotic medical device system. An operator may pass the control token back to being "free" by actuating the "Disable All" button. In the graphical user interface 904 for the control center, the "Disabled" button for the robotic medical device system is disabled. In an example embodiment, the "Enable All" button and the "RCL Enabled button in the graphical user interface 904 may be shown with a background or color that indicates that the control center does not have control, for example, the text and background of the button may be greyed out.

Figure 13:
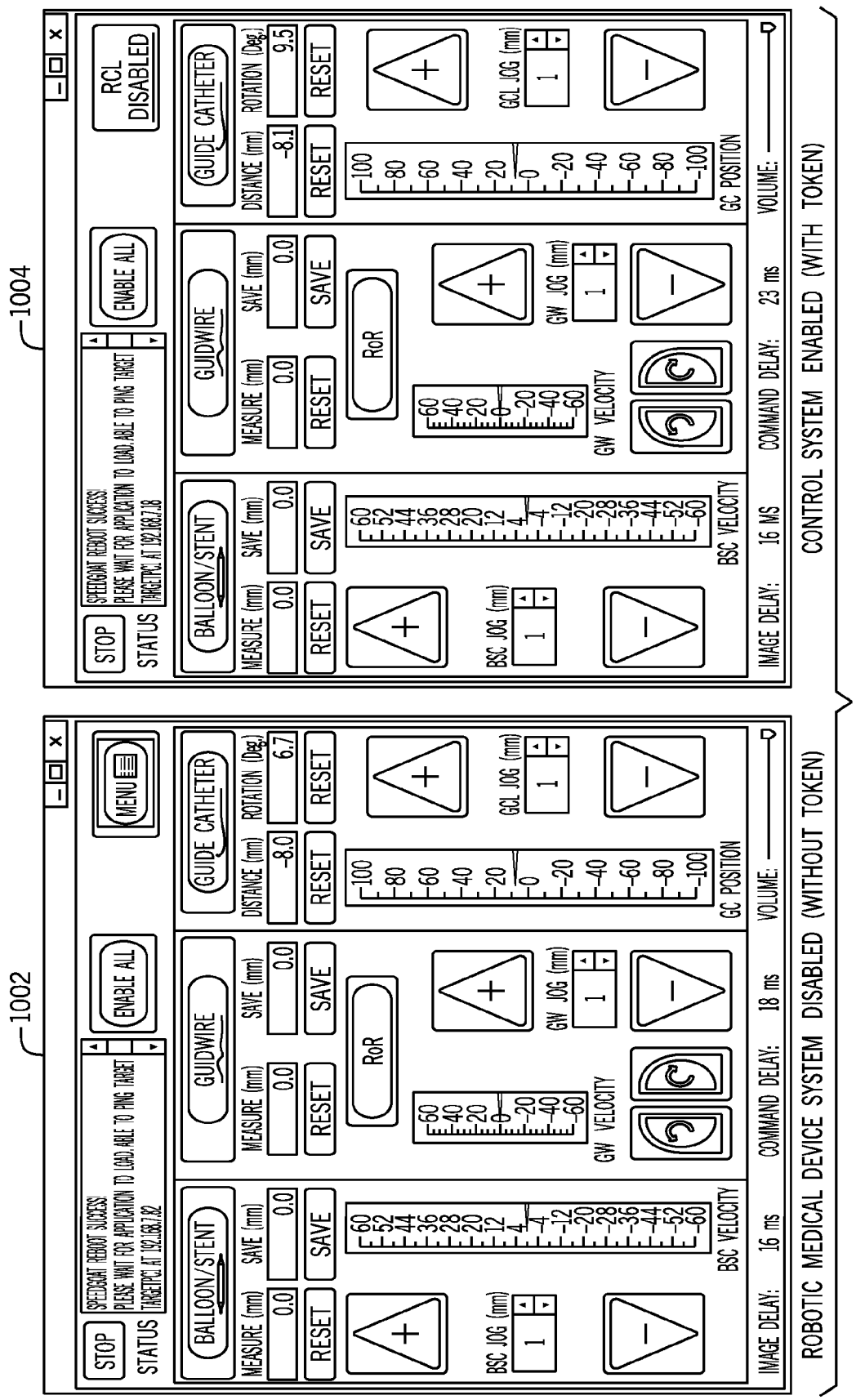
FIG. 13 shows example user interfaces when the control center is in control of the robotic medical device in accordance with example embodiments.

In a third state, the control token has been taken by the control center 202. FIG. 13 shows example user interfaces when the control center is in control of the robotic medical device in accordance with example embodiments. The graphical user interfaces 1002, 1004 shown are for control of an example catheter procedure system (e.g., catheter procedure system 100 shown in FIGS. 2 and 3). When the control token has been taken by the control center, the control center is given control and may be used to operate the robotic medical device.

In FIG. 13, when the control center has taken control with the control token, the "Enable All" button is enabled in graphical user interface 1004 for the control center. In addition, "RCL Disabled" in graphical user interface 1004 for the control center is enabled. In an example embodiment, the "RCL Disabled" button of graphical user interface 1004 may be shown with a highlight, background or color that indicates that the control center has control. For example, graphical user interface 1004 is shown with an underline under "RCL Disabled." In another example embodiment, the "RCL Disabled" button is shown in a color such as green. In the graphical user interface 1002 for the robotic medical device system, the "Enable All" button is disabled and the robotic medical device system is unable to take the control token. In an example embodiment, the "Enable All" button of graphical user interface 1002 may be shown with a background or color that indicates that the robotic medical device system does not have control, for example, the text and background of the button may be greyed out.

In an example embodiment, in the second and third state when one of the control center or the robotic medical device system has the control token, the site without the control token may have a request token or a force request token. The request token or force request token are virtual tokens implemented in software. The request token and force request token may be used to request control or to force a change in control. For example, if the control center has the control token the robotic medical device system may send a request token to the control center to request the control token be made "free" and available for the robotic medical device system to take the control token. In response to receiving the request token, the control center may, for example, make the control token "free", choose to keep the control token or timeout and keep the control token. In another example, if the control center has the control token the robotic medical device system may send a force request token to the control center to request the control token be made "free" and available for the robotic medical device system to take the control token. In response to the force request token, the control center may, for example, make the control token "free", choose to keep the control token or timeout and loose the control token.

As discussed above with respect to FIGS. 3 and 4, multiple control centers 202 may be in communication with multiple robotic medical device systems 204 via a network 206 (e.g., a many-to-many configuration).

Figure 16:
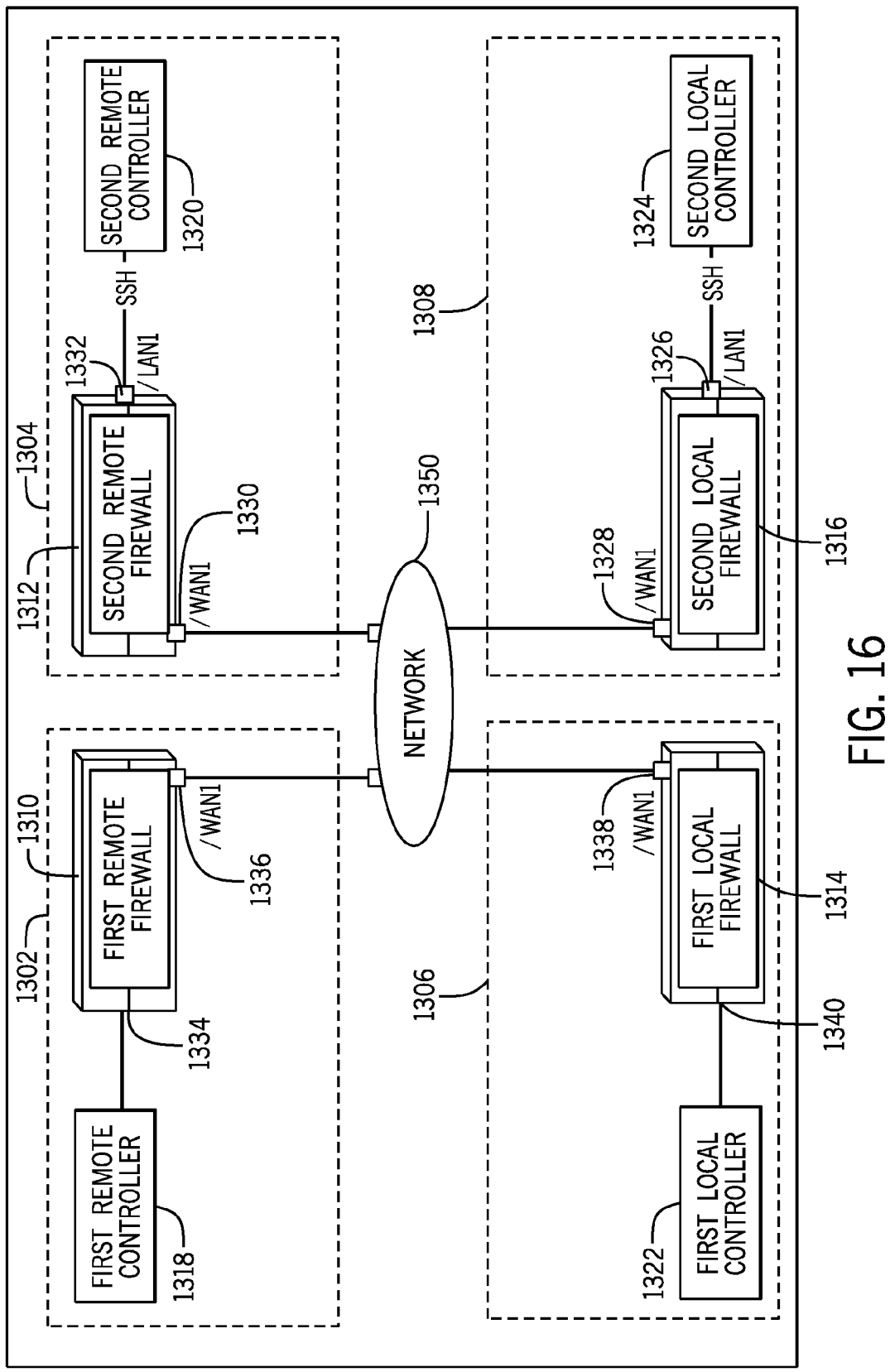
FIG. 16 is a block diagram of a many-to-many configuration of multiple control centers and multiple robotic medical device systems in accordance with example embodiments.

FIG. 16 is a block diagram of a many-to-many configuration of multiple control centers and multiple robotic medical device systems in accordance with example embodiments.

In FIG. 16, a first control center 1302, a second control center 1304, a first robotic medical device system 1306 and a second robotic medical device system 1308 are in communication over a network 1350. In an embodiment, each site (i.e., first control center 1302, second control center 1304, first robotic medical device system 1306 and second robotic medical device system 1308) may be at a different locations and may be remote from one another. The first control center 1302 is at a first remote site, the second control center 1304 is at a second remote site, the first robotic medical device system 1306 is at a first local site and the second robotic medical device system 1308 is at a second local site. The first control center 1302 may be used to control either the first robotic medical device system 1306 or the second robotic medical device system 1308. The second control center 1304 may be used to control either the first robotic medical device system 1306 or the second robotic medical device system 1308.

The first control center 1302 includes a first remote firewall 1310, the second control center 1304 includes a second remote firewall 1312, the first robotic medical device system 1306 includes a first local firewall 1314 and the second robotic medical device system 1308 includes a second local firewall 1316. First remote firewall 1310 is coupled to a first remote controller 1318, second remote firewall 1312 is coupled to a second remote controller 1320, first local firewall 1314 is coupled to a first local controller 1322 and the second local firewall 1316 is coupled to a second local controller 1324. First remote firewall 1310 includes a LAN port 1334 and a WAN port 1336. Second remote firewall 1312 includes a LAN port 1332 and a WAN port 1330. First local firewall 1314 includes a LAN port 1340 and a WAN port 1338. Second local firewall 1316 includes a LAN port 1326 and a WAN port 1328.

Firewalls 1310, 1312, 1314 and 1316 are configured to establish a secure connection with another site and to take down the secure connection with another site. Preferably, control and management of establishing secure connections and taking down secure connections is handled automatically by each firewall and kept separate from the other hardware and software functions at each site. In at least one example embodiment, a command line interface (CLI) and secure shell (SSH) protocol are used to establish a secure connection between two sites. In this example embodiment, each firewall 1310, 1312, 1314 and 1316 has a unique static IP address. The following discussion will describe establishing a secure connection between the second control center 1304 and the second robotic medical device system 1308, however, the methods described herein may be used to establish and take down connections between any combination of sites in the many-to-many configuration. In at least one example embodiment, a centralized approach is used. In the centralized approach, the WAN port 1330 of the second control center 1304 and the WAN port 1328 of the second robotic medical device system 1308 are open for SSH login. In this configuration, either site (e.g., second control center 1304 and second robotic medical device system 1308) may create a tunnel via its local firewall's LAN port and the WAN port of the other site. For example, the second local controller 1324 of the second robotic medical device system 1308 can SSH into the local LAN port 1326 of the second local firewall 1316 and the second local controller 1324 can SSH into the WAN port 1330 of the second remote firewall 1312 of the second control center 1304 to establish a tunnel. In another centralized approach example, the second remote controller 1320 of the second control center 1304 can SSH into the WAN port 1328 of the second local firewall 1316 of the second robotic medical device system 1308 and the second remote controller 1320 of the second control center 1304 can SSH the local LAN port 1332 of the second remote firewall 1312.

In another example embodiment, a decentralized approach is used. In the decentralized approach, the WAN port 1330 of the second control center 1304 and the WAN port 1328 of the second robotic medical device system 1308 do not allow for SSH login. In this example embodiment, each site brings up its corresponding tunnel connection via its respective local firewall's LAN port such that the WAN ports can remain closed to SSH login for enhanced security. For example, the second local controller 1324 can SSH into LAN port 1326 and the second remote controller 1320 can SSH into the LAN port 1332.

In another example embodiment, a secure connection may be established using patch panel direct routing where physically direct wiring is used between all of the sites (or nodes) on the patch panel. The connected ports may be switched when need to connect to a specific site.

In yet another example embodiment, a secure connection may be established by using two static IP addresses for all sites (or nodes). The same two static IP addresses are reserved on a routers for all of the sites. A site is only plugged in to the system (by a user) when it is being used and unplugged (by a user) from an Ethernet port when it is not being used.

In another example embodiment, a secure connection may be established using the same static IP address for all sites (or nodes). The static IP address and the Ethernet port mapping may be manually reconfigured on a router.

In another example embodiment, the secure tunnel established between two firewalls is a secure virtual private network such as, for example, an IPSec tunnel. To establish an IPSec tunnel, in one example, the first control center 1302 and the first robotic medical device system 1306 have a shared key. The first local firewall 1314 of the first robotic medical device system 1306 brings up a tunnel pointing to the first remote firewall 1310 of the first control center 1302. The first remote firewall 1310 then brings up a tunnel pointing to the first local firewall 1314. In this example, neither site opens up their wan port to accept an SSH login. In another example, to establish an IPSec tunnel, the first local firewall 1314 allows for SSH logon. The first remote firewall 1310 logs on to the first local firewall 1314 using SSH. The first remote firewall 1310 then brings up the first local firewall's 1314 end of the tunnel to point to the first remote firewall 1310. The first remote firewall 1310 points its tunnel to the first local firewall 1314. The first remote firewall 1310 can then determine a key for both sites. In an example embodiment, there is an a priori network topology map such that all local and remote sites are aware of their network locations.

In another example embodiment, management of the multiple systems and connections in the many-to-many configuration may be managed using cloud computing. For example, a cloud-based infrastructure management solution may be used to manage the firewall at each site (or node). Each firewall (e.g., first remote firewall 1310, second remote firewall 1312, first local firewall 1314 and second local firewall 1316 shown in FIG. 16) are connected to the Internet and the cloud used for management. Cloud-based management allows an operator at one of the sites or at a separate location from the various sites to monitor and manage the firewalls.

One or more example embodiments also provide remote medical device systems, methods and/or non-transitory computer-readable storage mediums configured to limit and/or maintain a constant maximum overtravel of a robotic medical device caused by, for example, delays and/or jitter in transmission of control signals (including movement commands) and images, while maintaining system stability. Overtravel (also referred to herein as overtravel distance) refers to the distance between the actual (or desired) position of the robotic medical device in the patient and the user-perceived (or displayed) position of the robotic medical device at a remote control center.

The overtravel may be a result of a user closing the loop on the desired position of the robotic medical device in situations in which image feedback and/or velocity (movement) commands (e.g., linear and/or rotational) to the robotic medical device are delayed.

One or more example embodiments also provide remote medical device systems, methods and/or non-transitory computer-readable storage mediums configured to maintain a constant or substantially constant percent overshoot of step response independent of total delay resulting from, for example, delays and/or jitter in transmission of control signals and images between the control center and a remote medical device system.

In accordance with example embodiments discussed below, the robotic medical device system may be a catheter procedure system that controls the movement and operation of elongated medical devices (e.g., catheters, guidewires, balloon catheters, microcatheters, etc.). Thus, the robotic medical device may be one or more elongated medical devices, each of which may move linearly and/or rotationally. The linear and rotational movement may be separate, concurrent or simultaneous. For clarity, example embodiments will be discussed with regard to a robotic medical device.

Although discussed separately, aspects of example embodiments discussed herein may be combined.

With reference back to the communications and control system 200 shown in FIG. 4, according to an example embodiment, the local command and control module 214 may control the movement of the remote medical device 246 by attenuating the requested velocity (velocity command or commanded velocity), which may be axial (linear) or rotational, by applying a velocity control function $G(T_{delay})$ thereto. In one example, the velocity control function $G(T_{delay})$ may be a non-linear function of total delay $T_{delay}$ that takes values between 0 and 1 ($0 < G(T_{delay}) \le 1$). In other examples, the velocity control function $G(T_{delay})$ may take values between 0 and 2 ($0 < G(T_{delay}) \le 2$). However, example embodiments should not be limited to these examples.

The velocity control function $G(T_{delay})$ may be determined based on limiting the maximum overtravel from a risk mitigation perspective.

The total delay $T_{delay}$ may be the sum of a command delay $T_{command}$ and an image feedback delay $T_{image}$ as given in equation (5) shown below.

$$T_{delay} = T_{command} + T_{image} \quad (5)$$

In at least this example embodiment, the command delay $T_{command}$ refers to the delay or latency in transmission of the command and control signals from the control center 202 to the robotic medical device system 204. As discussed supra, in one example, the local command and control module 214 may determine the command delay $T_{command}$ based on timestamps provided on the command and control signals from the remote command and control module 212. For example, the command delay $T_{command}$ may be computed as the difference between the time at which a command is issued by a user at the control center 202 and a time at which the command is received at the robotic medical device system 204.

The image feedback delay $T_{image}$ refers to the delay or latency associated with the transmission of image and/or hemodynamic data from the robotic medical device system 204 to the control center 202 for display to the remote user (e.g., at display 240 and/or storage in memory). Although the image feedback delay $T_{image}$ may include image and/or hemodynamic data, example embodiments will be discussed with regard to image data for the sake of brevity.

In one example, the image feedback delay $T_{image}$ may be computed at the remote command and control module 212, and signaled to the local command and control module 214 to compute the total delay $T_{delay}$. In another example, the local command and control module 214 may determine the round trip delay of the image data as discussed above or in any suitable manner (e.g., based on transmission time information and receipt acknowledgement information at the local command and control module 214). In yet another, more specific, example, the image feedback delay $T_{image}$ may be computed as the difference between the time ($T_{patientside}$) at which an image frame is captured (e.g., indicated via a time stamp) and the time ($T_{controlside}$) at which the captured image frame is received at the control center 202.

In at least one other example embodiment, the total delay $T_{delay}$ may be computed as follows.

The local command and control module 214 records the image frame capture time $T_f$, which indicates the time at which an image frame is captured at the patient side (e.g., via a time stamp). The local command and control module 214 then sends the image frame capture time $T_f$ to the control center 202 along with the captured image frame. The control center 202 then includes the image frame capture time $T_f$ as part of the (e.g., next or other subsequent) command package frame (including command and control signals or signaling) to the local command and control module 214 upon reception of the full image frame package. The local command and control module 214 may then compute the total delay $T_{delay}$ as the difference between the command receipt time $T_c$ at which the command package frame (including the image frame capture time $T_f$) is received and the time $T_f$ (i.e., $T_{delay} = T_c - T_f$).

One or more of the command delay $T_{command}$ or the image feedback delay $T_{image}$ may be a result of network delay and/or jitter between the control center 202 and the robotic medical device system 204.

In at least one example embodiment, the local command and control module 214 may apply the velocity control function $G(T_{delay})$ to a commanded velocity $v_{command}$ included in command and control signals received from the control center 202 to obtain a device velocity $v_{device}$ at which to move the robotic medical device 246. Accordingly, the local command and control module 214 may obtain or set the device velocity $v_{device}(t)$ at which to move the robotic medical device 246 at time t based on the commanded velocity $v_{command}$ and the velocity control function $G(T_{delay})$. In at least one example embodiment, when taking a value less than 1, the application of the velocity control function $G(T_{delay})$ may attenuate and/or reduce the commanded velocity $v_{command}$ as needed to limit and/or maintain a constant or substantially constant maximum overtravel of the robotic medical device 246.

When sending velocity commands with a joystick, for example, a user may command linear and/or rotational velocities in the range of $[-v_{max}, v_{max}]$. Under non-compensated delay control, in some instances, it may be assumed that the velocity control function $G(T_{delay})=1$. In one example, the maximum commanded velocity $v_{max}$ for linear movement (advancement or retraction) of a guidewire may be about 12 mm/s in a "normal" mode and about 60 mm/s in "turbo" mode. For rotational movement, in one example, maximum commanded velocity $v_{max}$ may be about 360 degrees per second.

In another example, a maximum commanded velocity $v_{max}$ for linear movement (advancement or retraction) of a guide catheter may be about 24 mm/s. For rotational movement, in one example, a maximum commanded velocity $v_{max}$ may be in terms of revolutions per second (e.g., about 0.5 revolutions per second).

As discussed herein, the velocity control function $G(T_{delay})$ may also be referred to as a velocity adjustment function, a velocity constraint function or a velocity attenuation function.

The velocity control function $G(T_{delay})$, according to example embodiments, will be discussed in more detail below.

Nyquist stability analysis may be used to maintain Nyquist stability under a known (e.g., computed) command delay $T_{command}$ and image feedback delay $T_{image}$. In this analysis, it is assumed that the user in the loop (e.g., the user providing the commands at the control center 202) is providing, at time t, the commanded velocity $v_{command}(t)$ for moving the robotic medical device 246, wherein the commanded velocity $v_{command}(t)$ is proportional to a difference in the desired device position $r_{desired}(t)$ and the delayed feedback position $x_{device}(t - T_{image})$ of the robotic medical device 246 to the user at the control center 202. The delayed feedback position $x_{device}(t-T_{image})$ in this example, is the position of the robotic medical device 246 at time $(t-T_{image})$.

The local command and control module 214 may attenuate the delayed commanded velocity $v_{command}(t-T_{delay})$ from the control center 202 by applying the velocity control function $G(T_{delay}) \in [0, \infty)$, wherein $T_{delay}=(T_{image}+T_{command})$, such that the velocity $v_{device}$ of the robotic medical device 246 at time t (i.e., $v_{device}(t)$) is given by equation (6) shown below:

$$v_{device}(t)=G(T_{delay})(r_{desired}(t-T_{command})-x_{device}(t-(T_{image}+T_{command}))=G(T_{delay})v_{command}(t-T_{delay}) \quad (6)$$

In equation (6), $r_{desired}(t-T_{command})$ is the desired position of the robotic medical device 246 at time $(t-T_{command})$ and $x_{device}(t-(T_{image}+T_{command}))$ is the position of the robotic medical device 246 at time $(t-(T_{image}+T_{command}))=(t-T$ Delay). Thus, the velocity $v_{device}(t)$ of the robotic medical device 246 at time t is determined based on the velocity control function $G(T_{delay})$, the desired (or expected) device position $r_{desired}(t-T_{command})$ and the actual device position $x_{device}(t-(T_{image}+T_{command}))$, at time $(t-(T_{image}+T_{command}))$. The device velocity $v_{device}(t)$ of the robotic medical device 246 at time t may also be characterized as being determined based on the velocity control function $G(T_{delay})$ and the delayed commanded velocity $v_{command}(t-T_{delay})$ received at the local command and control module 214. As discussed in more detail later, in some example embodiments, for a total delay $T_{delay}$ greater than or equal to a threshold acceptable delay $t_{acceptable}$, the device velocity $v_{device}(t)$ of the robotic medical device 246 at time t may be determined by attenuating (or, alternatively, adjusting) the delayed commanded velocity $v_{command}(t-T_{delay})$ based on the velocity control function $G(T_{delay})$ that takes a value between 0 and 1. On the other hand, for a total delay $T_{delay}$ less than the threshold acceptable delay $t_{acceptable}$, the velocity control function $G(T_{delay})$ may take a value of 1, and the delayed commanded velocity $v_{command}(t-T_{delay})$ may not be attenuated.

In a robotic medical device system according to one or more example embodiments, the forward loop transfer function H(s), in terms of the total delay $T_{delay}$ and as shown below in equation (7), may be utilized to analyze the Nyquist stability of the system.

$$H(s) = \frac{x_{device}(s)}{E_{device}(s)} = G(T_{delay})\frac{e^{-sT_{delay}}}{s} \quad (7)$$

Because the robotic medical device system does not include any unstable poles, expression (8) shown below is a necessary and sufficient condition for stability.

$$\left|G(T_{delay})\frac{e^{-sT_{delay}}}{s}\right|_{s=j\omega} = \frac{G(T_{delay})}{\omega} < 1, \frac{\pi}{2T_{delay}} \leq \omega < \infty \quad (8)$$

Consequently, a function $$0 \leq G(T_{delay}) < \frac{\pi}{2T_{delay}}, \frac{\pi}{2T_{delay}} \leq \omega < \infty$$

satisfies Nyquist stability for the system.

Although the above-mentioned function is discussed herein, other functions may also satisfy the constraints. For example, if a fixed phase margin φ is desired (e.g., to ensure a relatively or substantially consistent step response with a fixed feedback delay, then the velocity control function G $(T_{delay})$ may be given by equation (9) shown below.

$$G(T_{delay}) = \frac{\pi - 2\varphi}{2T_{delay}}, 0 \leq \varphi < \frac{\pi}{2} \quad (9)$$

In this case, a constant phase margin of 45 degrees may be chosen so that $$\varphi = \frac{\pi}{4} \text{ and } G(T_{delay}) = \frac{\pi}{4T_{delay}}.$$

According to at least some example embodiments, the velocity control function $G(T_{delay})$ may take values greater than 1. In instances such as this, other constraints may also be added to the velocity control function $G(T_{delay})$ such that performance is acceptable. The additional constraints may be added and/or selected by a user. In one example, the additional constraints may be based on the total delay $T_{delay}$ such that the velocity control function $G(T_{delay})$ is set to a different value (and the commanded velocity attenuated differently) based on the total delay $T_{delay}$ at a given time. An example in which additional constraints are added to the velocity control function $G(T_{delay})$ is shown below in equation (10).

$$G(T_{delay}) = \begin{cases} 2, 0 \leq T_{delay} < \frac{\pi}{8}s \\ \frac{\pi}{4T_{delay}}, \frac{\pi}{8} \leq T_{delay} < 2s \\ 0, T_{delay} \geq 2s \end{cases} \quad (10)$$

In this example, bringing the upper bound of the velocity control function $G(T_{delay})$ down to a constant number for lower delays (e.g., 2 or 1 for)

$$0 \leq T_{delay} < \frac{\pi}{8}s$$

may be useful for practical purposes such that system performance feels acceptable when $G(T_{delay})$ is, for example, 1.

Equation (10) is a relatively simple example illustrating that a phase margin may be specified, and corresponding delay chosen, so that a piecewise continuous function results. In one example, the gain is 2 when the delay is Equation (10) may be based on overall stability and may be bounded by equation (9) discussed above.

Figure 19:
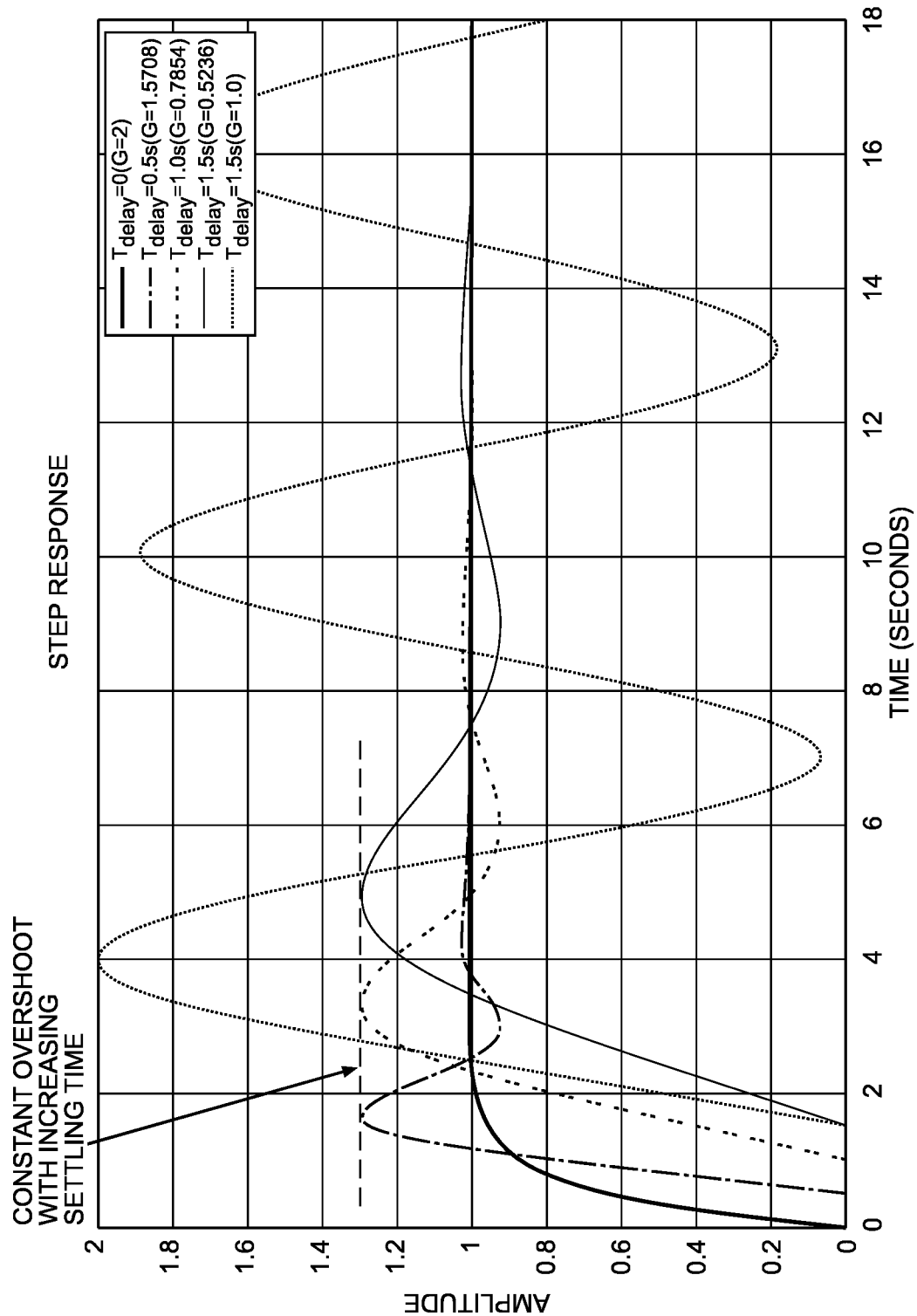
FIG. 19 is a graph illustrating example step responses for a robotic medical device system according to example embodiments.

The constraints in equation (10) provide the step responses shown in FIG. 19 when $T_{delay}=\{0, 0.5, 1.0, 1.5\}$ s and the velocity control function $$G(T_{delay}) = \left\{2, \frac{\pi}{2}, \frac{\pi}{4}, \frac{\pi}{6}\right\},$$

respectively. FIG. 19 also illustrates the step response when the nominal gain (e.g., the value of the velocity control function G $(T_{delay})$ is left at 1.0 for a 1.5 s total delay $(T_{delay}=1.5 s)$.

As shown in FIG. 19, without any attenuation, the robotic medical device system is nearly unstable as it reaches the maximum total delay, for unity feedback in which $G(T_{delay})=1$. As also illustrated in FIG. 19, however, because the velocity control function $G(T_{delay})$ preserves a constant phase margin, the overshoot may be maintained constant with increasing step response settling times (independent of changes in step response settling times).

According to one or more example embodiments, the velocity control function $G(T_{delay})$ may be further constrained to satisfy both the desired stability of the system and the performance constraints for a desired phase margin while limiting energy injected into the system as shown below in equation (11).

$$G(T_{delay}) = \begin{cases} 1, & 0 \leq T_{delay} < t_{acceptable} s \\ \min\left\{1, \frac{\pi - 2\varphi}{2T_{delay}}\right\}, & t_{acceptable} \leq T_{delay} < t_{disable} s \\ 0, & T_{delay} \geq t_{disable} s \end{cases} \quad (11)$$

In the example shown in equation (11), the velocity control function $G(T_{delay})$ is further constrained by the threshold acceptable delay $t_{acceptable}$ such that the commanded velocity $v_{command}$ may be attenuated in response to a total delay $T_{delay}$ greater than or equal to the threshold acceptable delay acceptable, but less than a maximum threshold delay $t_{disable}$ ($t_{acceptable} \leq T_{delay} < t_{disable}$). As discussed herein, this condition may be referred to as a "medium latency condition."

The maximum delay threshold $t_{disable}$ (also referred to as a disable or maximum latency threshold) may be the maximum length of time during which a command (e.g., movement command) from a user may be enabled. In an example, the maximum delay threshold $t_{disable}$ may be about 1.0 second (1000 ms). However, example embodiments should not be limited to this example. As discussed herein, a situation in which the total delay $T_{delay}$ is greater than or equal to the maximum delay threshold (disable may be referred to as a "high latency condition."

In another example, as shown below in equation (12), the device velocity $v_{device}(t)$ may be further constrained such that if the user wishes the robotic medical device 246 to return to zero motion only a maximum change in distance occurs for overtravel greater than 0 ($x_{overtravel} > 0$).

$$G(T_{delay}) = \begin{cases} 1, & 0 \leq T_{delay} < t_{acceptable} s \\ \min\left\{1, \frac{\pi - 2\varphi}{2T_{delay}}, \frac{x_{max\_overtravel}}{T_{delay} v_{max}}\right\}, & t_{acceptable} \leq T_{delay} < t_{disable} s \\ 0, & T_{delay} \geq t_{disable} s \end{cases} \quad (12)$$

In this case, the value of the velocity control function $G(T_{delay})$ is further based on the ratio of a maximum overtravel distance $x_{max\_overtravel}$ to a product of the total delay $T_{delay}$, and the maximum commanded velocity $v_{max}$, such that for total delay $T_{delay}$ between $t_{acceptable}$ and $t_{disable}$, the value of the velocity control function $G(T_{delay})$ is the minimum of 1, $$\frac{\pi - 2\varphi}{2T_{delay}} \text{ and } \frac{x_{max\_overtravel}}{T_{delay} v_{max}}$$

thereby further constraining the device velocity $v_{device}$ such that only a maximum overtravel distance occurs when the user wishes the robotic medical device 246 to stop (return to zero motion). The maximum overtravel distance may be selected by a user.

If the maximum overtravel $x_{max\_overtravel}$ distance is based on the threshold delay $t_{acceptable}$ and the maximum commanded velocity $v_{max}$ ($x_{max\_overtravel} = t_{acceptable} v_{max}$), then equation (12) may be re-written as equation (13) shown below, such that the velocity control function $G(T_{delay})$ is the minimum of 1, $$\frac{\pi - 2\varphi}{2T_{delay}}, \frac{t_{acceptable}}{T_{delay}}$$

for $t_{acceptable} \leq T_{delay} < t_{disable}$ s.

$$G(T_{delay}) = \begin{cases} 1, & 0 \leq T_{delay} < t_{acceptable} s \\ \min\left\{1, \frac{\pi - 2\varphi}{2T_{delay}}, \frac{t_{acceptable}}{T_{delay}}\right\}, & t_{acceptable} \leq T_{delay} < t_{disable} s \\ 0, & T_{delay} \geq t_{disable} s \end{cases} \quad (13)$$

In one example, where the robotic medical device is a guide wire, with $t_{acceptable}=400$ ms and $v_{max}=12$ mm/s (normal mode) for linear or axial movement, the maximum overtravel $x_{max\_overtravel} = t_{acceptable} v_{max} = 4.8$ mm. With $t_{acceptable}=400$ ms and $v_{max}=60$ mm/s (turbo mode), the maximum overtravel $x_{max\_overtravel} = t_{acceptable} v_{max} = 24$ mm.

With regard to rotational movement, where the robotic medical device is a guide wire, with $t_{acceptable}=400$ ms and $v_{max}=360$ degrees/s, the maximum overtravel $x_{max\_overtravel} = t_{acceptable} v_{max} = 144$ degrees.

In one example, where the robotic medical device is a guide catheter, with $t_{acceptable}=400$ ms and $v_{max}=24$ mm/s for linear or axial movement, the maximum overtravel $x_{max\_overtravel} = t_{acceptable} v_{max}$ 9.6 mm.

With regard to rotational movement, where the robotic medical device is a guide catheter, with $t_{acceptable}=400$ ms and $v_{max}=0.5$ revolutions/s, the maximum overtravel $x_{max\_overtravel} = t_{acceptable} v_{max} = 0.2$ revolutions.

In accordance with one or more example embodiments, using stability analysis, necessary and sufficient conditions to ensure stability have been provided. With these conditions, the value of the velocity control function $G(T_{delay})$ may be greater than 1.0.

By utilizing example embodiments, additional energy may be introduced while still maintaining system stability.

Additionally, a hard distance constraint may be utilized based on the perceptible delay in order to satisfy system stability, without introducing additional energy into the system and allowing for a maximum possible overtravel should the user wish to halt (stop) movement of the robotic medical device.

Methods for controlling operation of a remote medical device system according to example embodiments, based on the velocity control functions discussed above, will now be described with regard to the flow charts shown in FIGS. 17 and 18.

For example purposes, the example embodiments shown in FIGS. 17 and 18 will be described with regard to the systems and components shown in FIGS. 1-4. Moreover, in some cases, example embodiments will be discussed with regard to the robotic medical device system being a catheter procedure system (e.g., a catheter procedure system that controls the movement and operation of elongated medical devices, such as catheters, guidewires, balloon catheters, microcatheters, etc.). However, example embodiments should not be limited to this example. Further still, in at least some instances, example embodiments will be discussed with regard to linear (or axial) velocity (advancement or retraction) of a robotic medical device. It should be understood, however, that example embodiments are similarly applicable to angular or rotational speed and/or velocity.

Furthermore, although the example embodiments shown in FIGS. 17 and/or 18 will be discussed primarily with regard to operations performed at the local command and control module 214 at the robotic medical device system 204, example embodiments should not be limited to this example. Rather, example embodiments may be performed at other components, such as the remote command and control module 212, or distributed among various elements/components of the control center 202 and/or the robotic medical device system 204. For example, it should be understood that the example embodiments shown in FIGS. 17 and/or 18 may be described similarly with regard to the robotic medical device system 204 performing one or more of the functions/operations shown in FIGS. 17 and/or 18. In another example, the example embodiments shown in FIGS. 17 and/or 18 may be described with regard to a processor or controller configured to perform one or more functions/operations shown in FIGS. 17 and/or 18. With regard to the processor, in this case, the processor may be configured to execute computer readable instructions to cause the robotic medical device system to perform one or more of the functions/operations shown in FIGS. 17 and/or 18.

Figure 17:
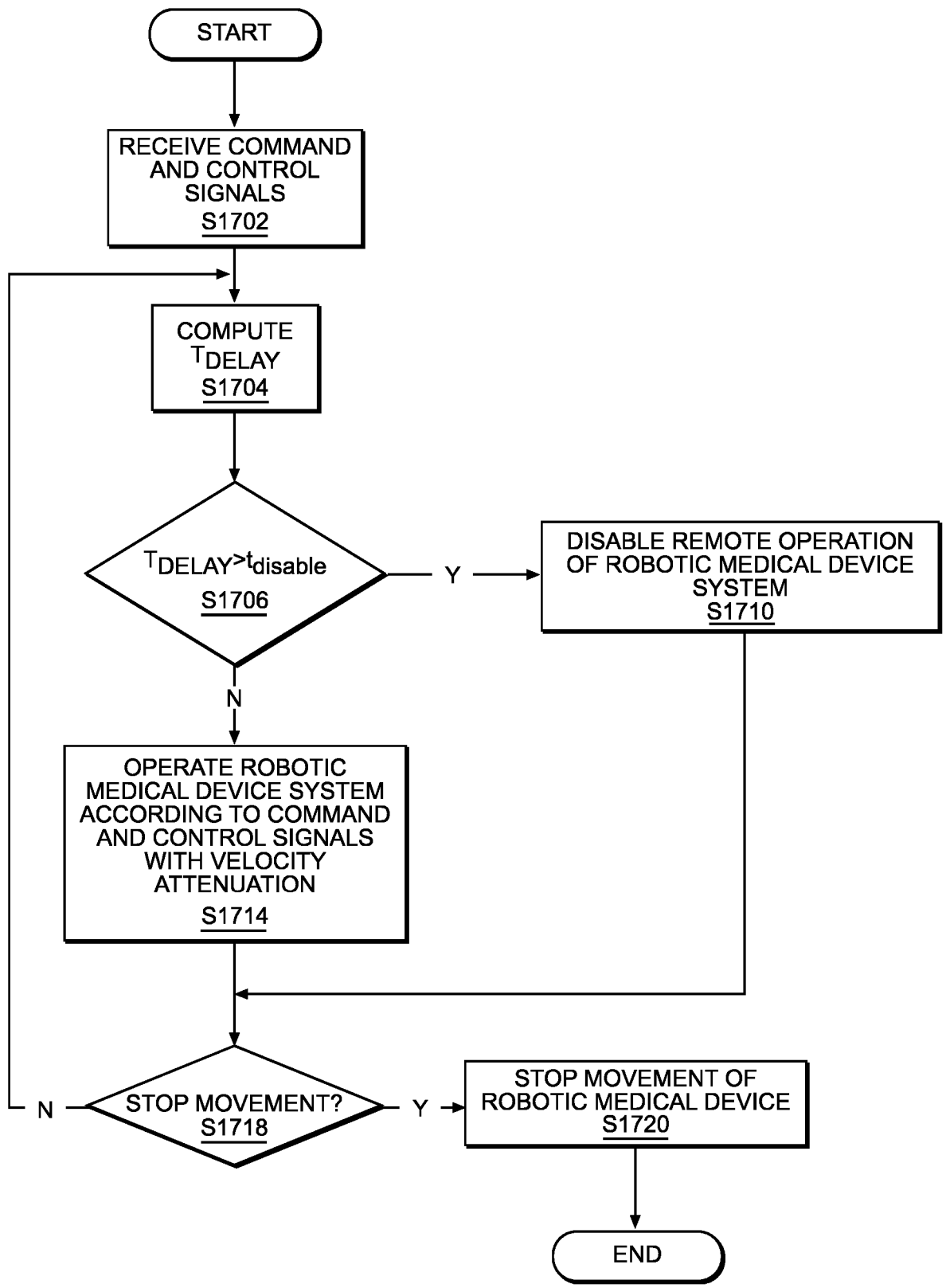
FIG. 17 is a flow chart illustrating a method according to example embodiments.
Figure 18:
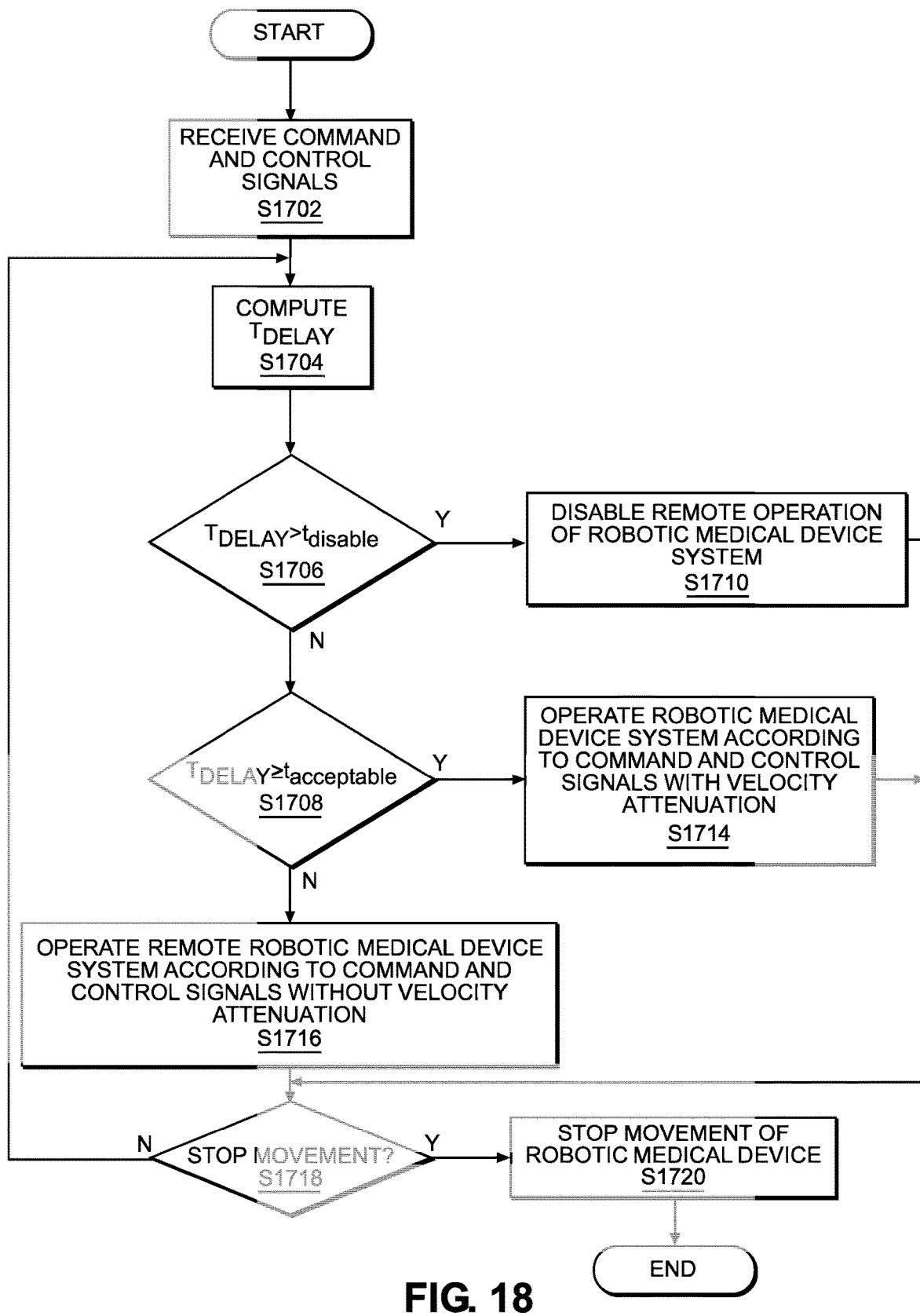
FIG. 18 is a flow chart illustrating another method according to example embodiments.

For example purposes, FIGS. 17 and 18 each illustrate an iteration of a method according to example embodiments (e.g., in response to command and control signals received until a stop command). However, example embodiments should not be limited to this example. Rather, it should be understood that the methods shown in FIGS. 17 and/or 18 may be performed iteratively and/or periodically as desired depending on operation of the robotic medical device system.

FIG. 17 is a flow chart illustrating a method for controlling operation of a robotic medical device system in accordance with example embodiments.

Referring to FIG. 17, at S1702 the local command and control module 214 receives command and control signals from the control center 202. In at least one example embodiment, the command and control signals may include a movement command (advance, retract, rotate, etc.) and a requested velocity (commanded velocity $v_{command}$) for the movement. The command and control signals may be similar, the same or substantially the same as those discussed supra.

At S1704, the local command and control module 214 computes the total delay $T_{delay}$ in response to receiving the command and control signals. As mentioned above, the local command and control module 214 may compute the total delay $T_{delay}$ as the sum of the command delay $T_{command}$ and the image feedback delay $T_{image}$.

At S1706, the local command and control module 214 determines whether the total delay $T_{delay}$ is greater than (or, alternatively, greater than or equal to) the maximum delay threshold $t_{disable}$. In one example, the local command and control module 214 determines whether the total delay $T_{delay}$ IS greater than the maximum delay threshold disable by comparing the total delay $T_{delay}$ with the maximum delay threshold t disable.

If the local command and control module 214 determines that the total delay $T_{delay}$ is less than or equal to (or, alternatively, less than) the maximum delay threshold $t_{disable}$, then at S1714 the local command and control module 214 operates the robotic medical device system 204 with velocity attenuation according to one or more example embodiments. In one example, the commanded velocity V command may be attenuated (selectively) based on the total delay $T_{delay}$.

According to at least some example embodiments, the local command and control module 214 may operate the robotic medical device system 204 with velocity attenuation (as needed) by applying one or more velocity control functions $G(T_{delay})$ discussed above to the commanded velocity $v_{command}$ included in the command and control signals received from the control center 202 to obtain the device velocity $v_{device}$ at which to move the robotic medical device 246 in response to the command and control signals. In one example, the local command and control module 214 may apply the velocity control function $G(T_{delay})$ given by equations (9) or (10) discussed above.

Still referring to FIG. 17, during movement of the robotic medical device 246, if at S1718 a stop command is received at the local command and control module 214, then at S1720 the local command and control module 214 stops movement of the robotic medical device 246. The process iteration then terminates.

In one example, as similarly discussed supra, a stop command may be an indication from the remote command and control module 212 that the user is no longer requesting movement of the robotic medical device 246 (joystick at rest position). In another example, the stop command may be an emergency stop.

Returning to S1718, if the local command and control module 214 does not received a stop command, then the process returns to S1704, at which the total delay $T_{delay}$ is recalculated and the process continues as discussed herein.

Returning to S1706 in FIG. 17, if the total delay $T_{delay}$ is greater than or equal to the maximum delay threshold $t_{disable}$, then at S1710 the local command and control module 214 disables remote operation of the robotic medical device system 204. The process then proceeds to step S1718 and continues as discussed herein.

In one example, at S1710 the local command and control module 214 may (e.g., temporarily) pause or stop remote control of the medical device 246 (and possibly movement thereof) and other components of the robotic medical device system 204.

The disabling of the remote operation of the robotic medical device system 204 may be temporary in that remote operation may be re-enabled (or resume) in response to the total delay $T_{delay}$ falling below the maximum delay threshold $t_{disable}$, assuming a stop command has not been received in the interim.

According to at least some example embodiments, in disabling remote operation of the robotic medical device system 204, control of the robotic medical device system 204 may be transferred to the local control console 238 or the bedside (e.g., via token passing as discussed supra). In this case, the local command and control module 214 may re-enable remote operation of the robotic medical device system 204 by transferring control back to the control center 202.

In the example embodiment shown in FIG. 17, the velocity control function $G(T_{delay})$ is applied to the commanded velocity $v_{command}$ to determine the device velocity $v_{device}$ without specifying an acceptable delay threshold above which the user perceives the delay as impacting performance. According to other example embodiments, however, the velocity control function $G(T_{delay})$ may be further constrained by taking into account the acceptable delay threshold $t_{acceptable}$ to both satisfy the desired system stability and performance constraints for a given phase margin while also limiting energy injected into the system. Such an example embodiment will be discussed in more detail with regard to FIG. 18.

FIG. 18 is a flow chart illustrating a method for controlling operation of a robotic medical device system in accordance with example embodiments.

The example embodiment shown in FIG. 18 is similar to the example embodiment shown in FIG. 17, except that the method (e.g., by way of the velocity control function $G(T_{delay})$ given by equation 11, 12 or 13 discussed above) is further constrained by taking into account an acceptable delay threshold $t_{acceptable}$ to both satisfy the desired system stability and performance constraints for a given phase margin while also limiting energy injected into the system. For the sake of brevity, only portions of FIG. 18 that differ from FIG. 17 will be discussed in detail.

Referring to FIG. 18, at S1702 the local command and control module 214 receives command and control signals at the local site from the control center 202.

At S1704, the local command and control module 214 computes the total delay $T_{delay}$ in response to receiving the command and control signals in the same or substantially the same manner as discussed above with regard to FIG. 17.

At S1706, in the same or substantially the same manner as the example embodiment shown in FIG. 17, the local command and control module 214 determines whether the total delay $T_{delay}$ is greater than (or, alternatively, greater than or equal to) the maximum delay threshold $t_{disable}$.

In this example embodiment, if the local command and control module 214 determines that the total delay $T_{delay}$ is less than or equal to (or, alternatively, less than) the maximum delay threshold disable at S1706, then at S1708 the command and control module 214 determines whether the total delay $T_{delay}$ is greater than or equal to the acceptable delay threshold $t_{acceptable}$.

If the total delay $T_{delay}$ is less than the acceptable delay threshold $t_{acceptable}$, then at S1716 the local command and control module 214 operates the robotic medical device system without velocity attenuation (e.g., $G(T_{delay})=1$, $0 \leq T_{delay} < t_{acceptable}$ s as given by equations (11), (12) or (13)). In this case, the local command and control module 214 causes the robotic medical device 246 to move at the commanded velocity ($v_{device}=v_{command}$) indicated in the command and control signals.

At step S1718, if the local command and control module 214 receives a stop command, then at S1720 the local command and control module 214 stops the movement of the robotic medical device 246. The process iteration then terminates.

Returning to S1718, if the local command and control module 214 does not receive a stop command, then the process returns to S1704, recomputes the total delay $T_{delay}$, and continues as discussed herein.

Returning to S1708, if the total delay $T_{delay}$ is greater than the acceptable delay threshold $t_{acceptable}$ ($t_{acceptable} \leq T_{delay} < t_{disable}$) then at S1714 the local command and control module 214 operates the robotic medical device system 204 with velocity attenuation according to one or more example embodiments. The process then proceeds to S1718 and continues as discussed herein.

In one example, at S1714 the local command and control module 214 may operate the robotic medical device system 204 with velocity attenuation by applying $$G(T_{Delay}) = \min\left\{1, \frac{\pi - 2\varphi}{2T_{delay}}\right\},$$

as shown in equation (11), to the commanded velocity $v_{command}$ included in the command and control signals received from the control center 202 at S1702 to obtain the device velocity $v_{device}$ at which to move the robotic medical device 246 in response to the command and control signals.

In another example, the local command and control module 214 may determine or control the device velocity $v_{device}$ for the robotic medical device 246 at S1714 by applying $$G(T_{delay}) = \min\left\{1, \frac{\pi - 2\varphi}{2T_{delay}}, \frac{x_{max\ overtravel}}{T_{delay} v_{max}}\right\}$$

as given by equation (12) or $$G(T_{Delay}) = \min\left\{1, \frac{\pi - 2\varphi}{2T_{delay}}, \frac{t_{acceptable}}{T_{delay}}\right\},$$

as given by equation (13) to maintain a substantially constant maximum overtravel and/or percent overshoot of the step response for the robotic medical device system 204, independent of variations in the total delay $T_{delay}$.

Returning to S1706 in FIG. 18, if the total delay $T_{delay}$ is greater than or equal to the maximum delay threshold $t_{disable}$, then at S1710 the local command and control module 214 disables remote operation of the robotic medical device system 204 in the same or substantially the same manner as discussed above with regard to FIG. 17. The process then proceeds to step S1718 and continues as discussed herein.

Figure 20:
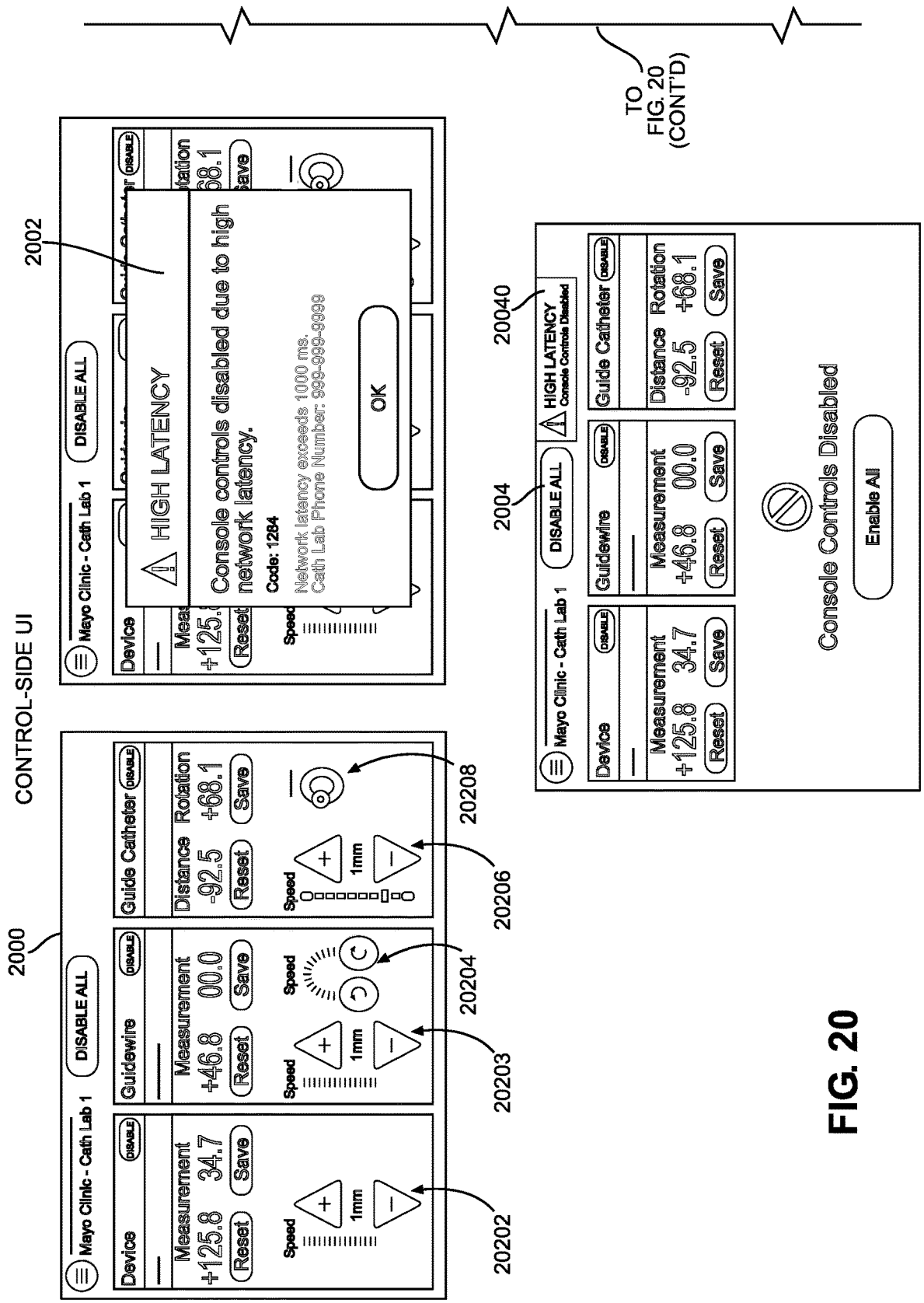
FIG. 20 illustrates example graphical user interface displays for a robotic medical device system according to example embodiments.
Figure 20:
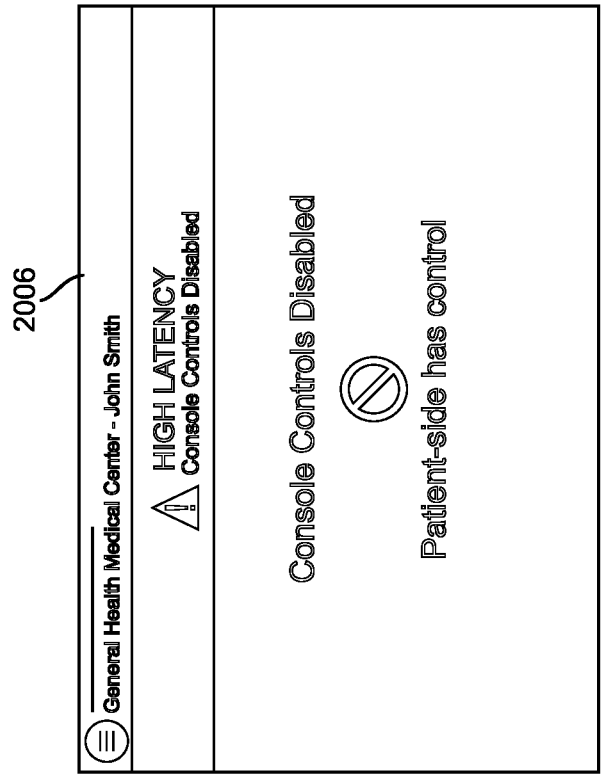
Figure 21:
FIG. 21 illustrates other example graphical user interface displays for a robotic medical device system according to example embodiments.

FIGS. 20 and 21 illustrate example user interface displays for a robotic medical device system according to example embodiments.

In FIGS. 20 and 21, the graphical user interface displays are for control of an example catheter procedure system.

As shown, the graphical user interface display 2000 for a control center (and similarly for a robotic medical device system) shows, for example, the same measurements, velocities, saved settings and which control of a control console is being actuated at the active site (i.e., either the control center at the remote site). Although not shown in FIGS. 20 and 21, in the same or substantially the same manner as discussed supra, each graphical user interface display may also show transmitted images from the robotic medical device system 204 to the control center 202 and the total delay $T_{delay}$.

Referring to FIG. 20, graphical user interface display 2000 may be displayed at the control center 202 (e.g., at display 240 or control console 236) when latency conditions do not exist (e.g., $T_{delay} < t_{acceptable}$). In this case, all drive controls (device, guidewire, guide catheter, etc.) are available to the user at the control center 202. The graphical user interface display 2000 also includes, inter alia, a "Disable All" button as discussed supra.

The drive controls for the robotic medical device 246 may include a linear velocity control 20202 to control the speed ($v_{command}$) of the advancement or retraction of the robotic medical device 246. In one example, the linear velocity control 20202 may be a discrete control, which causes the robotic medical device 246 to move 1 mm per button press. However, example embodiments should not be limited to this example.

The drive controls for the guidewire may include a linear velocity control 20203 to control the advancement or retraction of the guidewire, and a rotational velocity control 20204 to control the rotational speed and direction of the guidewire. In one example, the linear velocity control 20203 may be a discrete control, which causes the guidewire to move 1 mm per button press. Similarly, the rotational velocity control 20204 may be a discrete control, which causes the guidewire to rotate 225 degrees per button press. However, example embodiments should not be limited to this example.

The drive controls for the guide catheter may include a linear velocity control 20206 (e.g., a discrete control to move forward and reverse 1 mm) and a position meter display 20208.

Still referring to FIG. 20, the graphical user interface display 2000 also includes a current relative measurement position compared to last reset value (in this case 125.8), and a most recent saved measurement value (in this case 34.7).

In response to occurrence of a high latency condition (e.g., $T_{delay} \geq t_{disable}$ at S1706 in FIGS. 17 and/or 18), a high latency popup 2002 may be displayed to the user at the control center 202. The high latency popup 2002 may overlay the user interface display 2000 and indicate that the remote console controls have been disabled due to current network latency exceeding the maximum delay threshold $t_{disable}$ (in this case 1 s). According to at least one example embodiment, the high latency popup 2002 may accompany disabling of the remote console controls and stopping of the motion of the robotic medical device 246 at S1710 in FIGS. 17 and/or 18.

Once the user acknowledges the high latency condition (e.g., by "clicking" or pressing the "OK" button in the high latency popup 2002), the high latency popup 2002 is cleared.

After clearing the high latency popup 2002, graphical user interface display 2004 is shown to the user until the high latency condition resolves completely (e.g., until the total delay $T_{delay}$ falls below the maximum delay threshold $t_{disable}$). As shown, the graphical user interface display 2004 may indicate that the console controls are disabled and also include a high latency condition indicator 20040. Once resolved, the robotic medical device system 204 may enable (e.g., manually via pressing an "ENABLE ALL" button) the remote controls and the user at the control center 202 may continue to operate the robotic medical device system 204.

According to one or more example embodiments, the high latency popup 2002 may occur in response to the initial (e.g., first) occurrence of the high latency condition, but not thereafter. In response to subsequent high latency conditions, the graphical user interface display 2000 may change directly to the graphical user interface display 2004 to indicate the high latency condition and disabling of the remote controls.

At the local control console 238, in response to the occurrence of a high latency condition, graphical user interface display 2006 may be displayed to a local user at the patient-side. As shown, the graphical user interface display 2006 indicates that the remote console controls have been disabled.

Referring to FIG. 21, in response to an occurrence of a medium latency condition (e.g., $t_{acceptable} \leq T_{delay} < t$ disable), a medium latency popup 2100 may be displayed to the user at the control console 236. In this case, the medium latency popup 2100 indicates that the control (e.g., joystick) sensitivity is being adjusted and/or scaled (e.g., through application of the velocity control function to attenuate the commanded velocity) in the presence of the medium latency condition. Once the user acknowledges the medium latency condition by "clicking" the "OK" button, the medium latency popup 2100 is cleared, and the user at the control center 202 may continue to control the robotic medical device system 204 from the remote control console 236.

After clearing the medium latency popup 2100, graphical user interface display 2102 is shown to the user until the medium latency condition resolves completely (e.g., until the total delay $T_{delay}$ falls below the acceptable delay threshold acceptable). The graphical user interface display 2102 is similar to the graphical user interface display 2000 shown in FIG. 20, except that the graphical user interface display 2102 further includes a medium latency indicator 21020 indicating that the medium latency condition exists. Once resolved, the medium latency condition indicator 21020 may be cleared.

As with the example embodiment shown in FIG. 20, the medium latency popup 2100 may occur in response to the initial (e.g., first) occurrence of the medium latency condition, but not thereafter. In response to subsequent medium latency conditions, the graphical user interface display 2102 including the medium latency indicator 21020 may be shown to the user.

Still referring to FIG. 21, in response to the medium latency condition, graphical user interface display 2104 may be shown to the local user at the local control console 238 (patient-side). The user interface 2104 indicates that the remote console controls are enabled, but that the joystick sensitivity is being adjusted and/or scaled.

FIGS. 22-25 are graphs illustrating various aspects of example embodiments.

Figure 22:
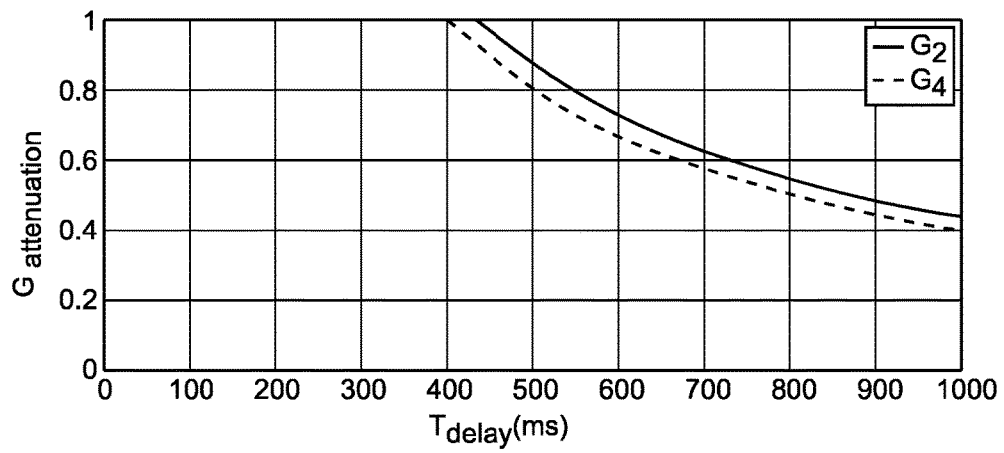
FIG. 22 is an example graph illustrating attenuation gain versus total delay time for a robotic medical device system according to example embodiments.

FIG. 22 is a graph illustrating an example gain profile for a robotic medical device system according to example embodiments. In this example, the gain profiles for velocity control function $G(T_{delay})$ given by equation (11) denoted as $G_2$ and equation (13) denoted as $G_4$ are shown.

As shown in FIG. 22, with regard to the velocity control function $G(T_{delay})$ given by equation (11), denoted as $G_2$, attenuation or scaling of the commanded velocity begins in response to the total delay $T_{delay}$ reaching about 433 ms ($t_{acceptable}$=433 ms). With regard to the velocity control function $G(T_{delay})$ given by equation (13), denoted as $G_4$, attenuation or scaling of the commanded velocity begins in response to the total delay $T_{delay}$ reaching about 400 ms ($t_{acceptable}$=400 ms). As shown, in both instances the scaling or attenuation of the velocity is non-linear.

Figure 23A:
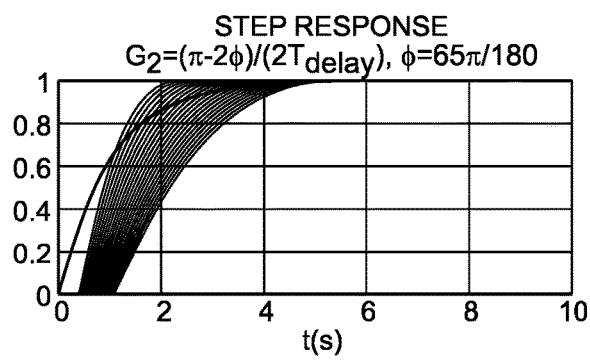
FIGS. 23A-23C illustrate example two-dimensional step response graphs for a robotic medical device system according to example embodiments.
Figure 23B:
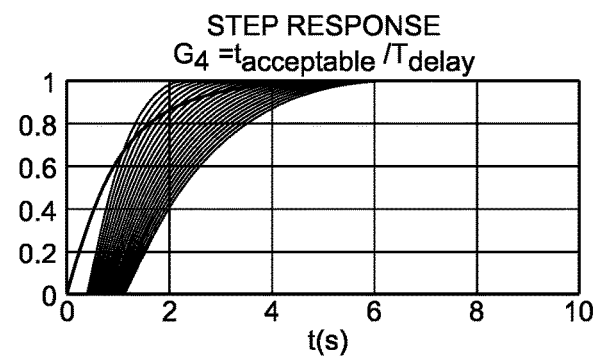
Figure 23C:
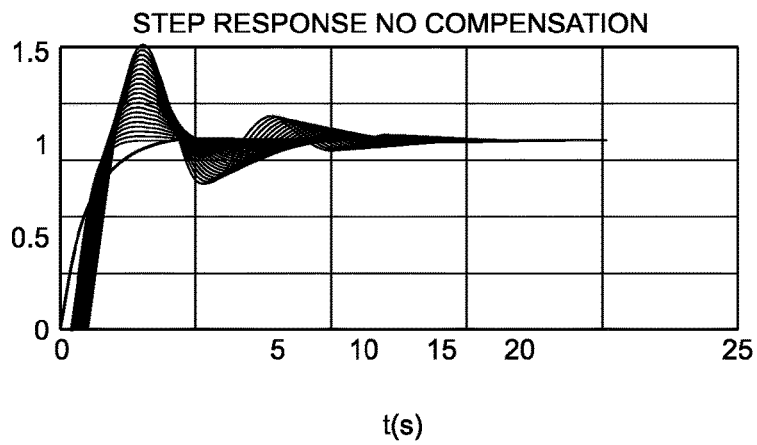

FIGS. 23A-23C are graphs illustrating example step responses of the robotic medical device system under different values of $T_{delay}$.

In more detail, FIG. 23A illustrates an example step response for a robotic medical device system under different values of $T_{delay}$ when applying the velocity control function $G(T_{delay})$ given by equation (11), denoted $G_2$.

FIG. 23B illustrates an example step response for a robotic medical device system under different values of $T_{delay}$ When applying the velocity control function $G(T_{delay})$ given by equation (13), denoted $G_4$.

FIG. 23C illustrates an example step response for a robotic medical device system under different values of $T_{delay}$ without applying the velocity control function $G(T_{delay})$ according to example embodiments (no compensation or attenuation).

As shown by comparison of FIGS. 23A and 23B with FIG. 23C, the application of the velocity control function according to example embodiments maintains system stability with increases in total delay.

Figure 24:
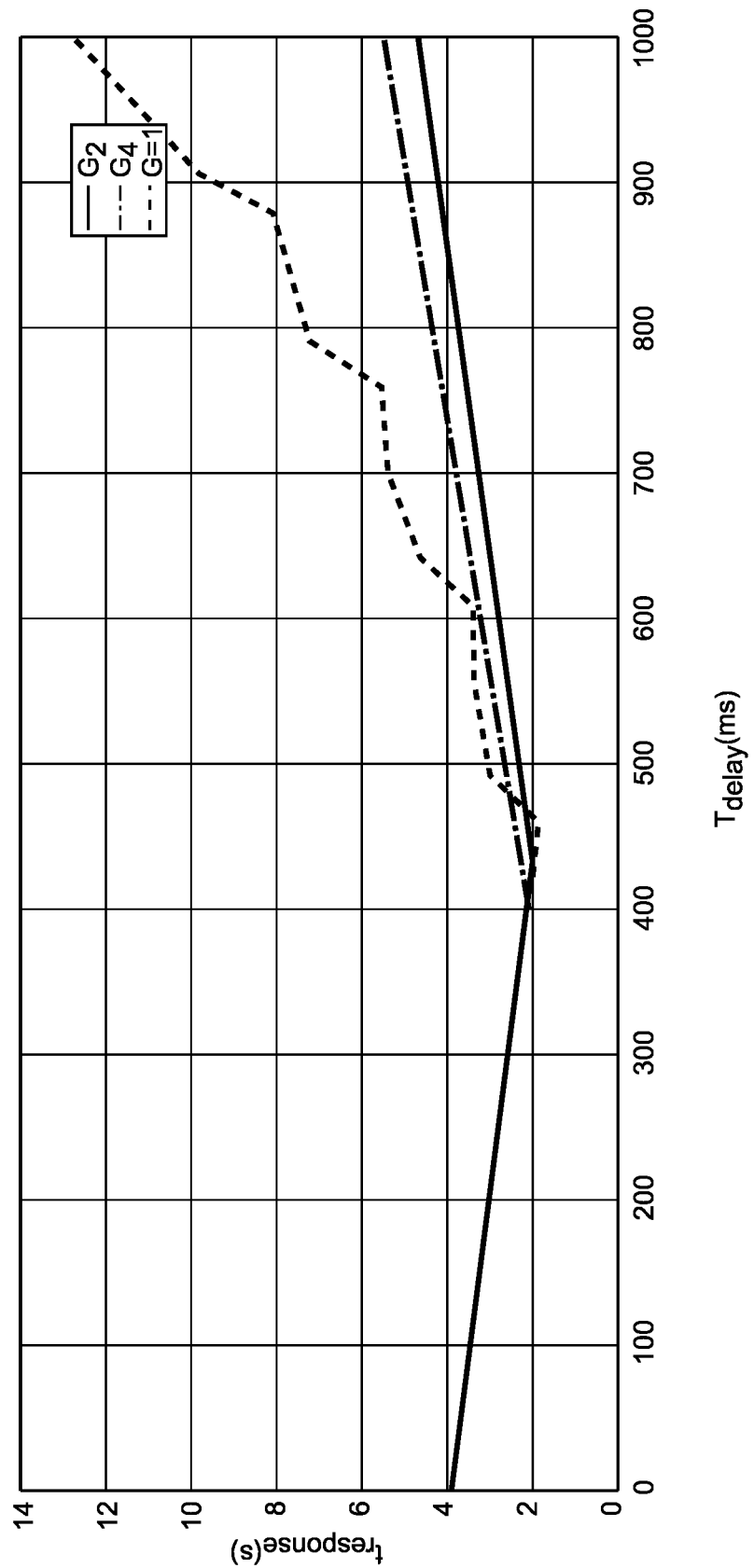
FIG. 24 illustrates another example graph illustrating step response versus total delay for a robotic medical device system according to example embodiments.

FIG. 24 is a graph illustrating example response time of a step response versus total delay $T_{delay}$ for a robotic medical device system according to example embodiments. In this example, the step response for application of the velocity control function $G(T_{delay})$ given by equation (11) denoted as $G_2$ and equation (13) denoted as $G_4$ are shown along with a graph (G=1) illustrating the step response without compensation or attenuation. As shown, the step response time for the robotic medical device system according to example embodiments shows stable and linear increases for $T_{delay}$ greater than or equal to about 400 ms with application of the velocity control function according to example embodiments.

Figure 25:
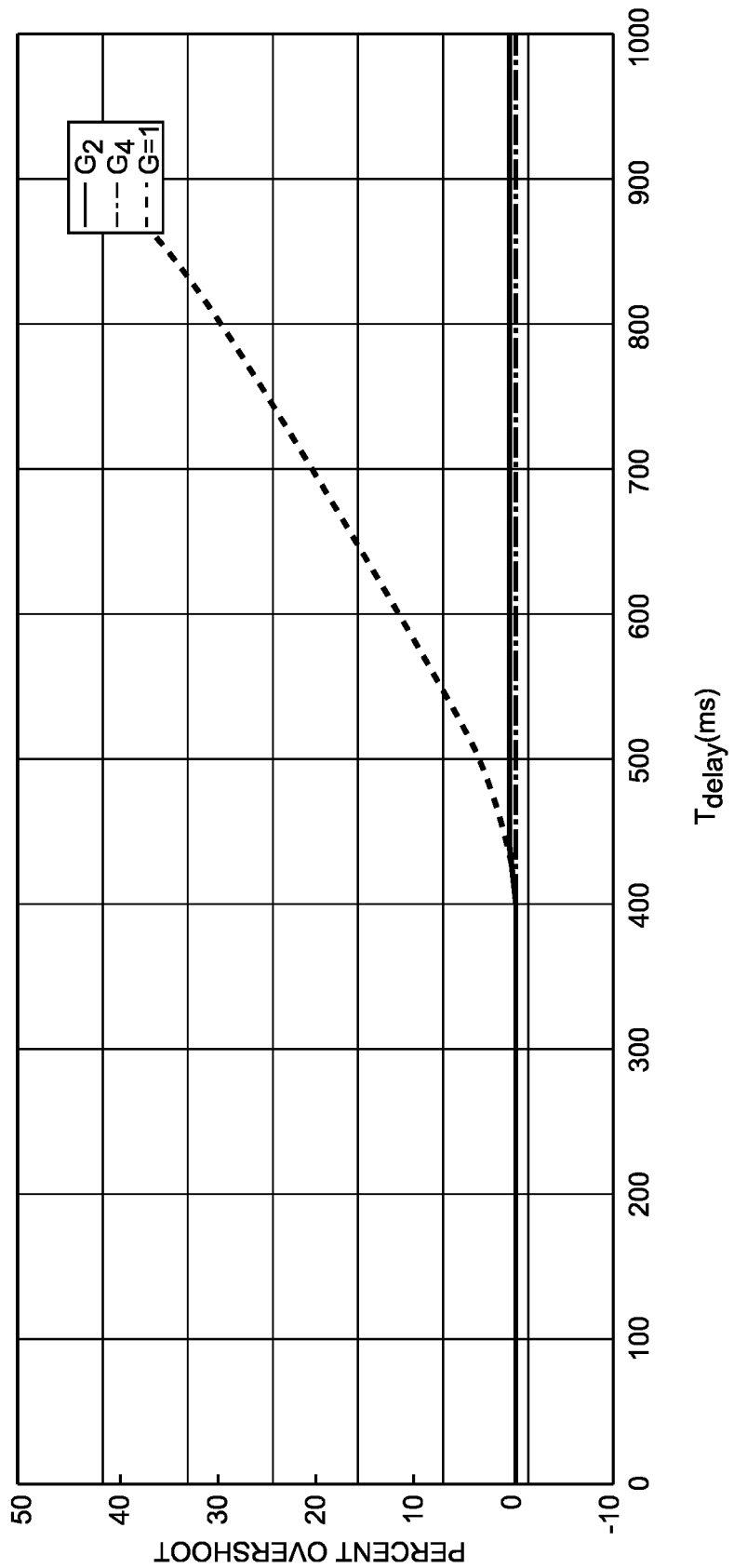
FIG. 25 illustrates another example graph illustrating percent overshoot versus total delay for a robotic medical device system according to example embodiments.

FIG. 25 is a graph illustrating an example percent overshoot of step response versus total delay $T_{delay}$. As shown, for an uncompensated or unattenuated system (G=1), the percent overshoot increases as the total delay $T_{delay}$ continually increases after the total delay $T_{delay}$ exceeds about 400 ms ($t_{acceptable}$=400 ms). In this example, the increase is non-linear. By contrast, by utilizing the velocity control functions $G(T_{delay})$ given by equations (11) denoted as $G_2$ and equations (13) denoted as $G_4$, the percent overshoot remains substantially constant (in the case of $G_4$) or increases slightly (in the case of $G_2$) and then remains substantially constant even after the total delay $T_{delay}$ exceeds about 400 ms ($t_{acceptable}$=400 ms).

One or more example embodiments may be utilized without definition of an acceptable delay (e.g., about 400 ms) before which the velocity control algorithm (also referred to as the speed attenuation algorithm) is applied.

Example embodiments provide mechanisms to achieve a constant or substantially constant phase margin (which results in a constant or substantially constant overshoot for different step responses) and further constraining the gain by maximum overtravel for safety.

According to one or more example embodiments, the gain G is calculated based on limiting the maximum overtravel (e.g., from a risk mitigation perspective), rather than a control system stability perspective. One or more example embodiments, may also define when the velocity control algorithm may be applied (e.g., between about 400 ms and about 1 s).

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

As discussed herein, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing robotic medical device systems, such as that disclosed in U.S. Patent Application Publication No. 2021/0220064 and/or International Publication No. WO 2019/222641, the entire contents of each of which are incorporated herein by reference. Such existing hardware may be processing or control circuitry such as, but not limited to, one or more processors, one or more Central Processing Units (CPUs), one or more controllers, one or more arithmetic logic units (ALUs), one or more digital signal processors (DSPs), one or more microcomputers, one or more field programmable gate arrays (FPGAs), one or more System-on-Chips (SoCs), one or more programmable logic units (PLUS), one or more microprocessors, one or more Application Specific Integrated Circuits (ASICs), or any other device or devices capable of responding to and executing instructions in a defined manner.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium," "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine-readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks. For example, as mentioned above, according to one or more example embodiments, at least one memory may include or store computer program code, and the at least one memory and the computer program code may be configured to, with at least one processor, cause a robotic medical device system to perform the necessary tasks. Additionally, the processor, memory and example algorithms, encoded as computer program code, serve as means for providing or causing performance of operations discussed herein.

A code segment of computer program code may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable technique including memory sharing, message passing, token passing, network transmission, etc.

The terms "including" and/or "having," as used herein, are defined as comprising (i.e., open language). The term "coupled," as used herein, is defined as connected, although not necessarily directly, and not necessarily mechanically. Terminology derived from the word "indicating" (e.g., "indicates" and "indication") is intended to encompass all the various techniques available for communicating or referencing the object/information being indicated. Some, but not all, examples of techniques available for communicating or referencing the object/information being indicated include the conveyance of the object/information being indicated, the conveyance of an identifier of the object/information being indicated, the conveyance of information used to generate the object/information being indicated, the conveyance of some part or portion of the object/information being indicated, the conveyance of some derivation of the object/information being indicated, and the conveyance of some symbol representing the object/information being indicated.

According to example embodiments, one or more elements of a robotic medical device system (e.g., local and/or remote command and control modules), or the like, may be (or include) hardware, firmware, hardware executing software or any combination thereof. Such hardware may include processing or control circuitry such as, but not limited to, one or more processors, one or more CPUs, one or more controllers, one or more ALUs, one or more DSPs, one or more microcomputers, one or more FPGAs, one or more SoCs, one or more PLUs, one or more microprocessors, one or more ASICs, or any other device or devices capable of responding to and executing instructions in a defined manner.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

We claim:

1. A robotic medical device system comprising:
a controller configured to, in response to one or more control signals, perform non-linear scaling of a velocity of a robotic medical device to maintain a constant overshoot for different step responses of the robotic medical device system independent of variations in a delay associated with control of the robotic medical device, wherein
the one or more control signals are received via a network, and
the different step responses include different step response settling times for the robotic medical device system.

2. The robotic medical device system of claim 1, wherein the delay includes at least one of a command delay or an image feedback delay.

3. The robotic medical device system of claim 1, wherein the controller is configured to perform the non-linear scaling of the velocity of the robotic medical device to maintain a constant maximum overtravel distance of the robotic medical device.

4. The robotic medical device system of claim 1, wherein the delay is at least partially based on a transmission delay for the network.

5. The robotic medical device system of claim 1, wherein the velocity of the robotic medical device includes at least one of linear or rotational velocity.

6. A method of operating a robotic medical device system including a robotic medical device and a controller, the method comprising:
performing, in response to one or more control signals, non-linear scaling of a velocity of the robotic medical device to maintain a constant overshoot for different step responses of the robotic medical device system independent of variations in a delay associated with control of the robotic medical device, wherein
the one or more control signals are received via a network, and
the different step responses include different step response settling times for the robotic medical device system.

7. The method of claim 6, wherein the delay includes at least one of a command delay or an image feedback delay.

8. The method of claim 6, wherein the performing of the non-linear scaling of the velocity of the robotic medical device maintains a constant maximum overtravel distance of the robotic medical device.

9. The method of claim 6, wherein the delay is at least partially based on a transmission delay for the network.

10. The method of claim 6, wherein the velocity of the robotic medical device includes at least one of linear or rotational velocity.

11. A robotic medical device system comprising:
a controller configured to, in response to one or more control signals, perform non-linear scaling of a velocity of a robotic medical device to maintain a constant maximum overtravel distance of the robotic medical device independent of variations in a delay associated with control of the robotic medical device, wherein
the delay is between a maximum acceptable delay threshold and a disable threshold,
the maximum acceptable delay threshold is greater than zero,
the one or more control signals are received via a network,
the non-linear scaling of the velocity is at least partially based on the constant maximum overtravel distance of the robotic medical device, and
the controller is configured to constrain the velocity of the robotic medical device to maintain the constant maximum overtravel stance in response to the delay being between the maximum acceptable delay threshold and the disable threshold.

12. The robotic medical device system of claim 11, wherein the controller is configured to disable operation of the robotic medical device in response to the delay being greater than the disable threshold.

13. The robotic medical device system of claim 11, wherein the velocity of the robotic medical device is unconstrained in response to the delay being less than the maximum acceptable delay threshold.

14. The robotic medical device system of claim 11, wherein the constant maximum overtravel distance is a maximum distance traveled by the robotic medical device after receipt of a command to stop movement of the robotic medical device.

15. The robotic medical device system of claim 11, wherein the maximum acceptable delay threshold is less than the disable threshold.

16. The robotic medical device system of claim 11, wherein the disable threshold is a maximum length of time during which a command, from a user, to move the robotic medical device is available to enabled.

17. The robotic medical device system of claim 1, wherein the robotic medical device is an elongated medical device.

18. The robotic medical device system of claim 17, wherein elongated medical device is a catheter, guidewire, balloon catheter, or microcatheter.

19. The robotic medical device system of claim 11, wherein the robotic medical device is an elongated medical device.

20. The robotic medical device system of claim 19, wherein elongated medical device is a catheter, guidewire, balloon catheter, or microcatheter.

* * * * *